US011161205B1

(12) United States Patent
Johnson

(10) Patent No.: US 11,161,205 B1
(45) Date of Patent: *Nov. 2, 2021

(54) ROBOTIC WIRE TERMINATION SYSTEM

(71) Applicant: Onanon, Inc., Milpitas, CA (US)

(72) Inventor: Dennis J. Johnson, Milpitas, CA (US)

(73) Assignee: Onanon, Inc., Milpitas, CA (US)

( * ) Notice: Subject to any disclaimer, the term of this patent is extended or adjusted under 35 U.S.C. 154(b) by 424 days.

This patent is subject to a terminal disclaimer.

(21) Appl. No.: 16/364,017

(22) Filed: Mar. 25, 2019

Related U.S. Application Data

(63) Continuation of application No. 14/693,292, filed on Apr. 22, 2015, now Pat. No. 10,239,164, which is a continuation-in-part of application No. 14/060,852, filed on Oct. 23, 2013, now Pat. No. 9,190,795.

(51) Int. Cl.
| | |
|---|---|
| *H01R 43/00* | (2006.01) |
| *B23K 37/04* | (2006.01) |
| *H01R 43/02* | (2006.01) |
| *H01R 4/02* | (2006.01) |

(52) U.S. Cl.
CPC ......... *B23K 37/04* (2013.01); *H01R 43/0249* (2013.01); *H01R 4/024* (2013.01); *H01R 43/0221* (2013.01); *Y10S 901/42* (2013.01)

(58) Field of Classification Search
CPC ........ B23K 37/04; H01R 4/024; H01R 4/027; H01R 4/16; H01R 43/02; H01R 43/0249
See application file for complete search history.

(56) References Cited

U.S. PATENT DOCUMENTS

| | | | |
|---|---|---|---|
| 5,163,856 | A | 11/1992 | McGaffigan |
| 5,269,056 | A | 12/1993 | Yang |
| 5,782,401 | A | 7/1998 | Hinrichs |
| 5,808,259 | A | 9/1998 | Spinner |
| 6,137,075 | A | 10/2000 | Grabkowski |
| 6,142,787 | A | 11/2000 | Ikesugi |
| 6,392,888 | B1 | 5/2002 | Chen |
| 6,818,839 | B2 | 11/2004 | Hosaka |
| 6,822,867 | B2 | 11/2004 | Hsieh |
| 6,887,104 | B2 | 5/2005 | Lee |

(Continued)

FOREIGN PATENT DOCUMENTS

| | | |
|---|---|---|
| JP | 2012084686 | 4/2012 |
| KR | 200291242 | 10/2002 |

OTHER PUBLICATIONS

PCT International Search Report and Written Opinion for PCT/US2015/027111; dated Jul. 30, 2015.

(Continued)

*Primary Examiner* — Robert J Utama
*Assistant Examiner* — Ayub A Maye
(74) *Attorney, Agent, or Firm* — Neustel Law Offices

(57) ABSTRACT

A robotic wire termination system for efficiently connecting a plurality of wires to an electrical connector. The robotic wire termination system generally includes a frame, a connector support attached to the frame, a robot manipulator having at least one arm, a heating device attached to the at least one arm and a control unit in communication with the robot manipulator to control the operation of the robot manipulator. The arm of the robot manipulator is adapted to move the heating device so that the heating device can apply heat to a selected connector pin of the electrical connector.

89 Claims, 49 Drawing Sheets

(56) References Cited

U.S. PATENT DOCUMENTS

| | | | |
|---|---|---|---|
| 6,945,814 B2 | 9/2005 | Snape | |
| 6,974,615 B2 | 12/2005 | Hosaka | |
| 7,973,239 B2 | 7/2011 | Koyama | |
| 9,904,259 B2 | 2/2018 | Bando | |
| 2002/0077003 A1 | 6/2002 | Northey | |
| 2008/0155823 A1 | 7/2008 | Heinzel | |
| 2008/0280495 A1 | 11/2008 | Ko | |
| 2011/0113626 A1 | 5/2011 | Ng | |
| 2011/0272126 A1* | 11/2011 | Hamlyn | B29C 70/382 165/177 |
| 2014/0201989 A1 | 7/2014 | Paynter | |
| 2015/0290736 A1 | 10/2015 | Zhang | |

OTHER PUBLICATIONS

PCT International Preliminary Report on Patentability and Written Opinion for PCT/US2015/0271111; dated Nov. 2, 2017.

* cited by examiner

ROBOTIC WIRE TERMINATION SYSTEM

CROSS REFERENCE TO RELATED APPLICATIONS

The present application is a continuation of U.S. application Ser. No. 14/693,292 filed on Apr. 22, 2015 which issues as U.S. Pat. No. 10,239,164 on Mar. 26, 2019, which is a continuation-in-part of U.S. application Ser. No. 14/060,852 filed on Oct. 23, 2013 now issued as U.S. Pat. No. 9,190,795. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND OF THE INVENTION

Field of the Invention

The present invention relates generally to wire termination and more specifically it relates to a wire termination system for efficiently connecting a plurality of wires to an electrical connector.

Description of the Related Art

Any discussion of the related art throughout the specification should in no way be considered as an admission that such related art is widely known or forms part of common general knowledge in the field.

There are various types of electrical connectors used today including but not limited to fine wire terminations, pinned connectors, terminal blocks, plug and socket connectors, medical connectors, transition devices and custom connectors. Conventional electrical connectors include a plurality of connector pins that have a corresponding plurality of wires from a cable that must be soldered together according to a pinout which cross-references the wires to the connector pins. Today, technicians manually connect each individual wire to a corresponding connector pin on the electrical connector. The number of connector pins on a connector range from 2 to greater than 100 connector pins which receive a corresponding number of wires.

Medical probes typically have numerous connector pins within an electrical connector that require a corresponding number of fine wires to be connected to. For example, modern catheters may contain more than 120 40-gauge wires connecting medical transducers. A skilled technician manually connects each of the fine wires to a corresponding connector pin on the electrical connector utilizing a soldering device (e.g. soldering iron or soldering gun). The technician must identify a fine wire and a corresponding connector pin where the fine wire will be connected to. After identifying the proper connection point for the fine wire, the technician then must position the fine wire adjacent to the connector pin and then heats the solder with the soldering device to melt upon both the fine wire and the connector pin. Once the technician removes the soldering device, the melted solder solidifies thereby physically and electrically connecting the fine wire to the connector pin. The technician manually repeats this process for each individual fine wire until all of the fine wires are connected.

As can be appreciated, the manual process of soldering a plurality of wires to an electrical connector is labor intensive, time consuming, costly and creates a significant amount of discarded material. Errors by technicians soldering wires to electrical connectors are common with error rates approaching 25% with some medical connectors where the wires are very thin and where a single mistake typically results in the complete loss of the connector. For example, technicians may mistakenly connect a wire to an incorrect connector pin thereby resulting in a defective electrical connector being produced thereby requiring additional time to fix or the complete loss of the electrical connector. Errors by technicians are further compounded by the increasingly smaller wires used in electrical connectors today, particularly in the medical industry, where some devices require 100 or more connector pins within a square centimeter. To make matters worse for technicians, they must often times connect extremely fine wires having a 40-gauge or 50-gauge size.

Because of the inherent problems with conventional wire termination systems, there is a need for a new and improved wire termination system for efficiently connecting a plurality of wires to an electrical connector.

BRIEF SUMMARY OF THE INVENTION

The invention generally relates to a wire termination system which includes a heat applicator device that selectively applies heat to a specific connector pin within an electrical connector so that a corresponding wire may be soldered to the connector pin. The heat applicator device applies heat to a first connector pin for a period of time for soldering of a first wire to the first connector pin and then the heat is removed. The heat applicator device then applies heat to the next connector pin for soldering a next wire to the next connector with the process continuing until all of the wires are soldered to their corresponding connector pins on the electrical connector.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 4 is a cross sectional view taken along line 4-4 of FIG. 3a.

FIG. 11b is a cross sectional view taken along line 11b-11b of FIG. 11a.

FIG. 13b is an end view of the variation of the heat receptacle shown in FIG. 13a.

DETAILED DESCRIPTION OF THE INVENTION

A. Overview of Invention

Figure 30:
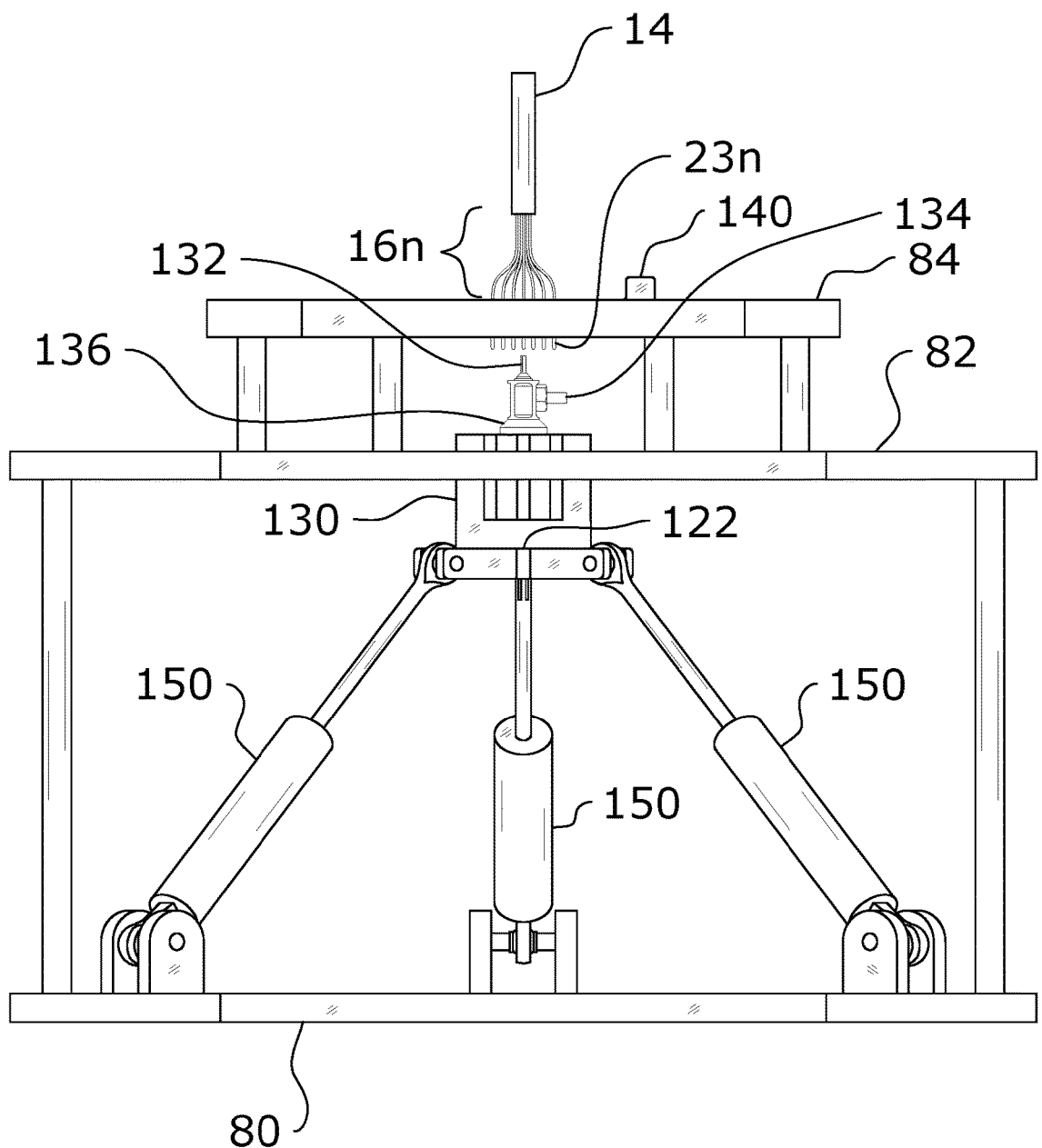
FIG. 30 is a side view of a third embodiment of the present invention using actuators to move the heating element for the robotic heater.
Figure 31:
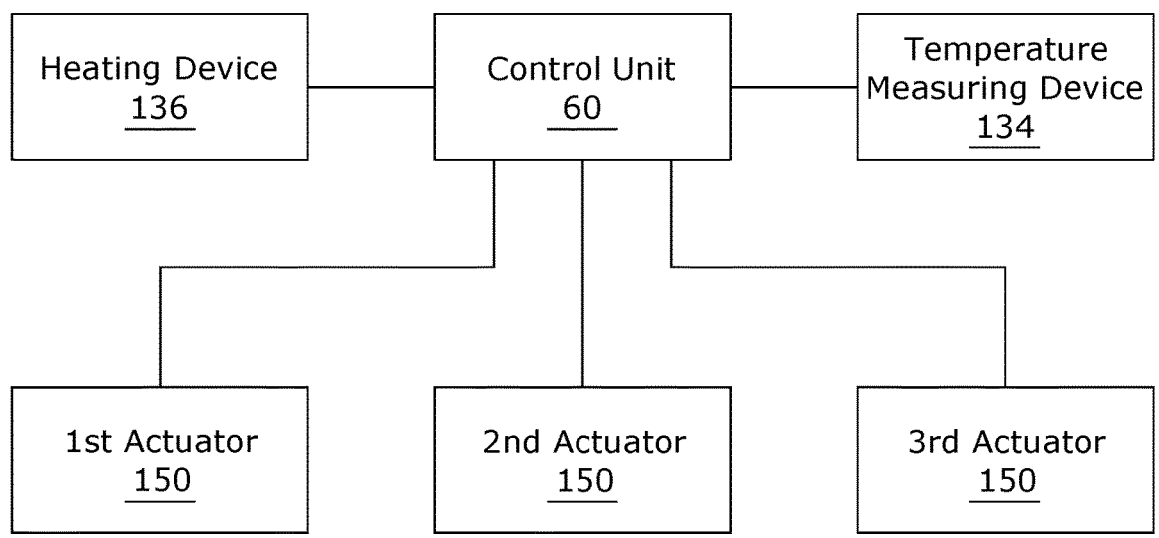
FIG. 31 is a block diagram of the third embodiment illustrating the communications with the control unit and the elements of the third embodiment.
Figure 32:
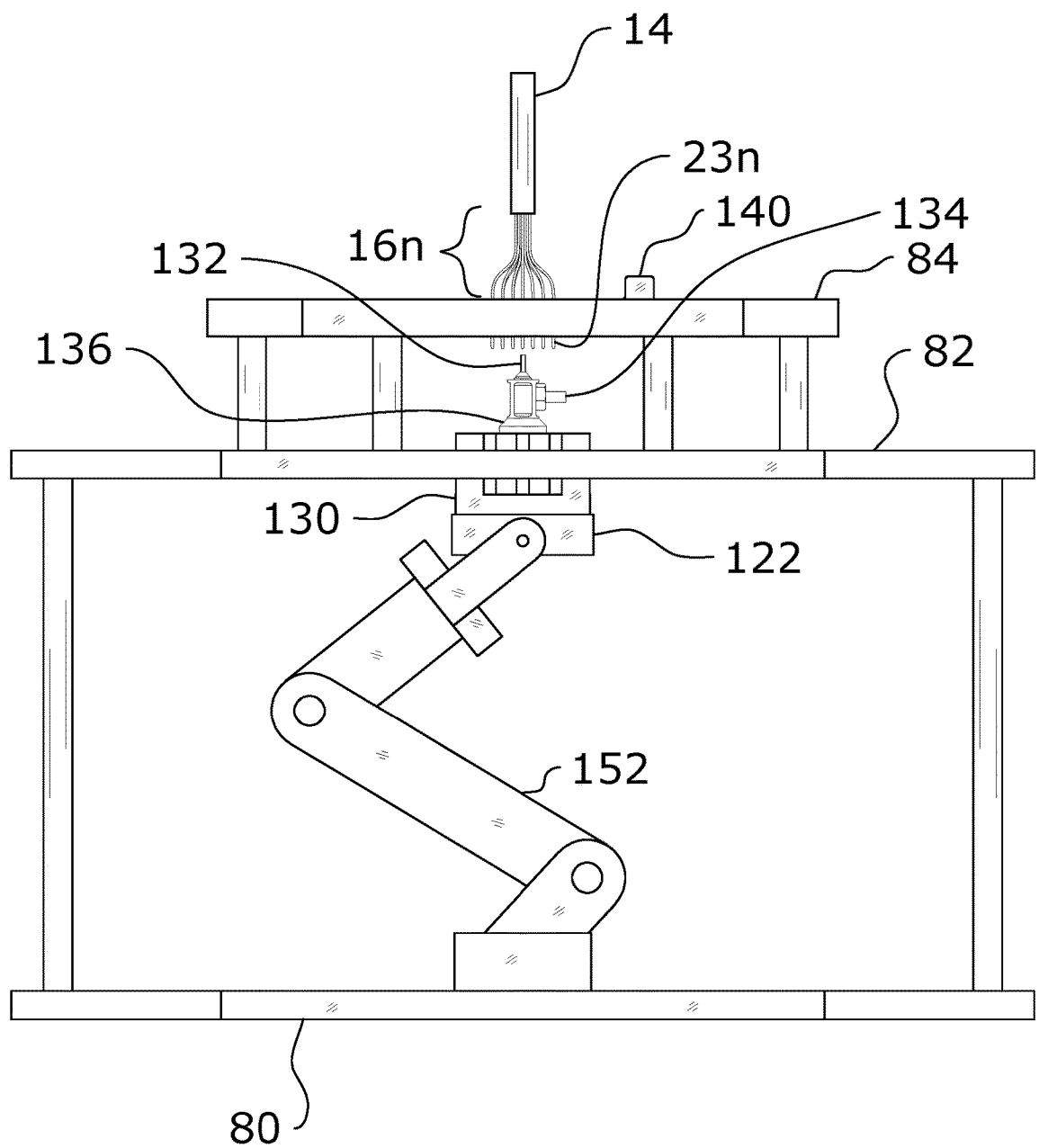
FIG. 32 is a side view of a fourth embodiment of the present invention using a robotic arm to move the heating element for the robotic heater.

FIGS. 1 through 18 illustrate the present invention comprised of the wire termination system 10. FIGS. 19 through 29 illustrate a second embodiment for a robotic wire termination system and FIGS. 30 through 31 illustrate a third embodiment for a robotic wire termination system. FIG. 32 illustrates a fourth embodiment for a robotic wire termination system.

The wire termination system 10 generally includes a heat applicator device 30 that selectively applies heat to a specific connector pin within an electrical connector 20 so that a corresponding wire may be soldered to the connector pin. The heat applicator device 30 applies heat to a first connector pin for a period of time for soldering of a first wire to the first connector pin and then the heat is removed. The heat applicator device 30 then applies heat to the next connector pin for soldering a next wire to the next connector with the process continuing until all of the wires 16a-g are soldered to their corresponding connector pins 23a-g on the electrical connector 20.

B. Electrical Connector

The electrical connector 20 may be comprised of any device where electrical wires 16a-g are terminated at. There are various types of electrical connectors 20 used today including but not limited to fine wire terminations, pinned connectors, terminal blocks, plug and socket connectors, medical connectors, transition devices and custom connectors. The electrical connector 20 may be for various types of industries such as but not limited to the medical industry.

As illustrated in FIGS. 1b through 4 of the drawings, the electrical connector 20 includes a plurality of connector pins 23a-g that extend through an insulator housing 22. The connector pins 23a-g are comprised of an electrical conductive material such as metal. The insulator housing 22 electrically insulates the respective connector pins 23a-g and also supports the connector pins 23a-g. The insulator housing 22 may have various shapes (e.g. circular as illustrated in FIGS. 3b and 3c), thicknesses and sizes.

The connector pins 23a-g are typically parallel with one another and may form various types of shapes and patterns. Also, the number of connector pins 23a-g on a connector 20 may range from 2 connector pins 23a-g to greater than 100 connector pins 23a-g.

Figure 2:
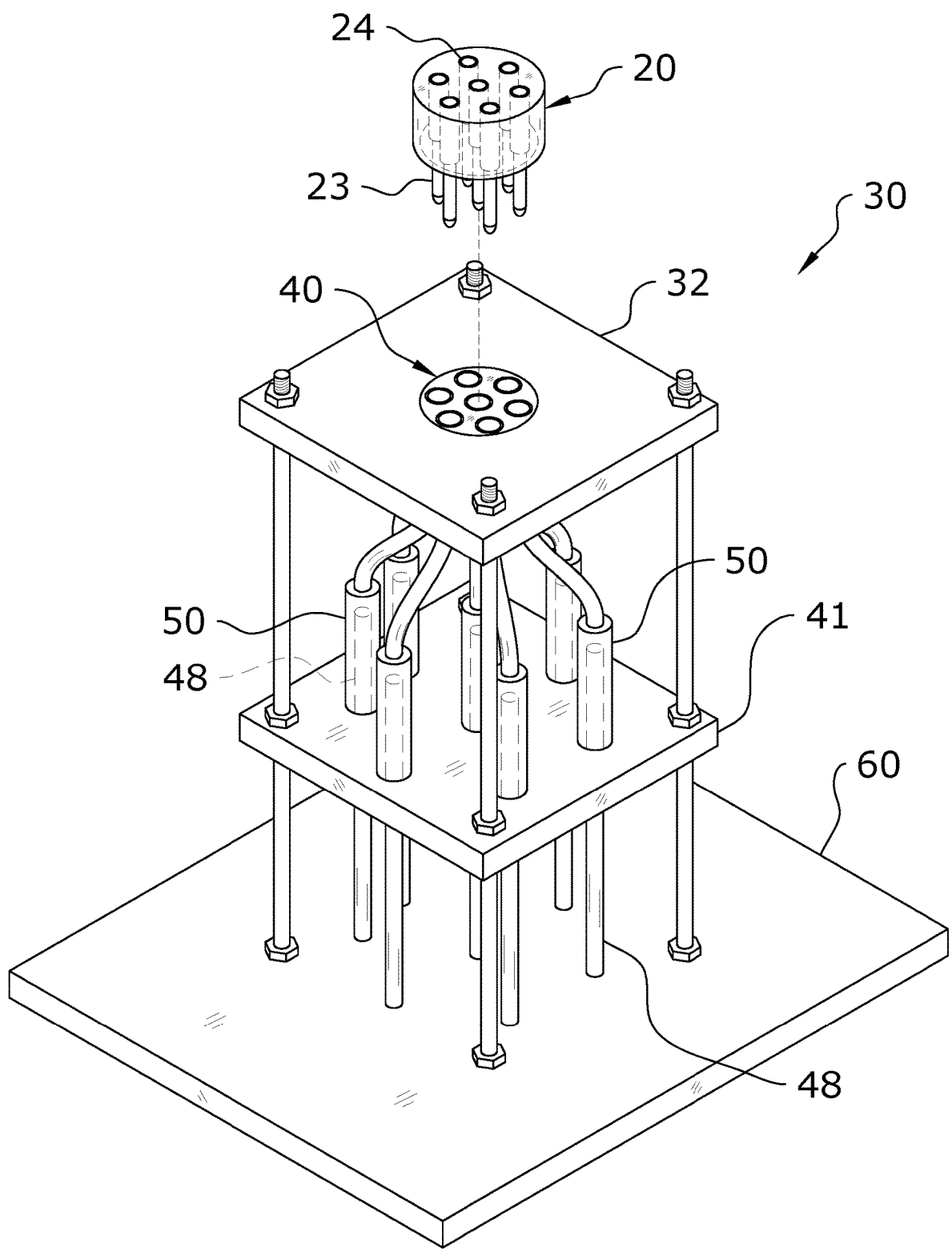
FIG. 2 is an upper perspective view of the heat unit with the electrical connector removed.
Figure 3A:
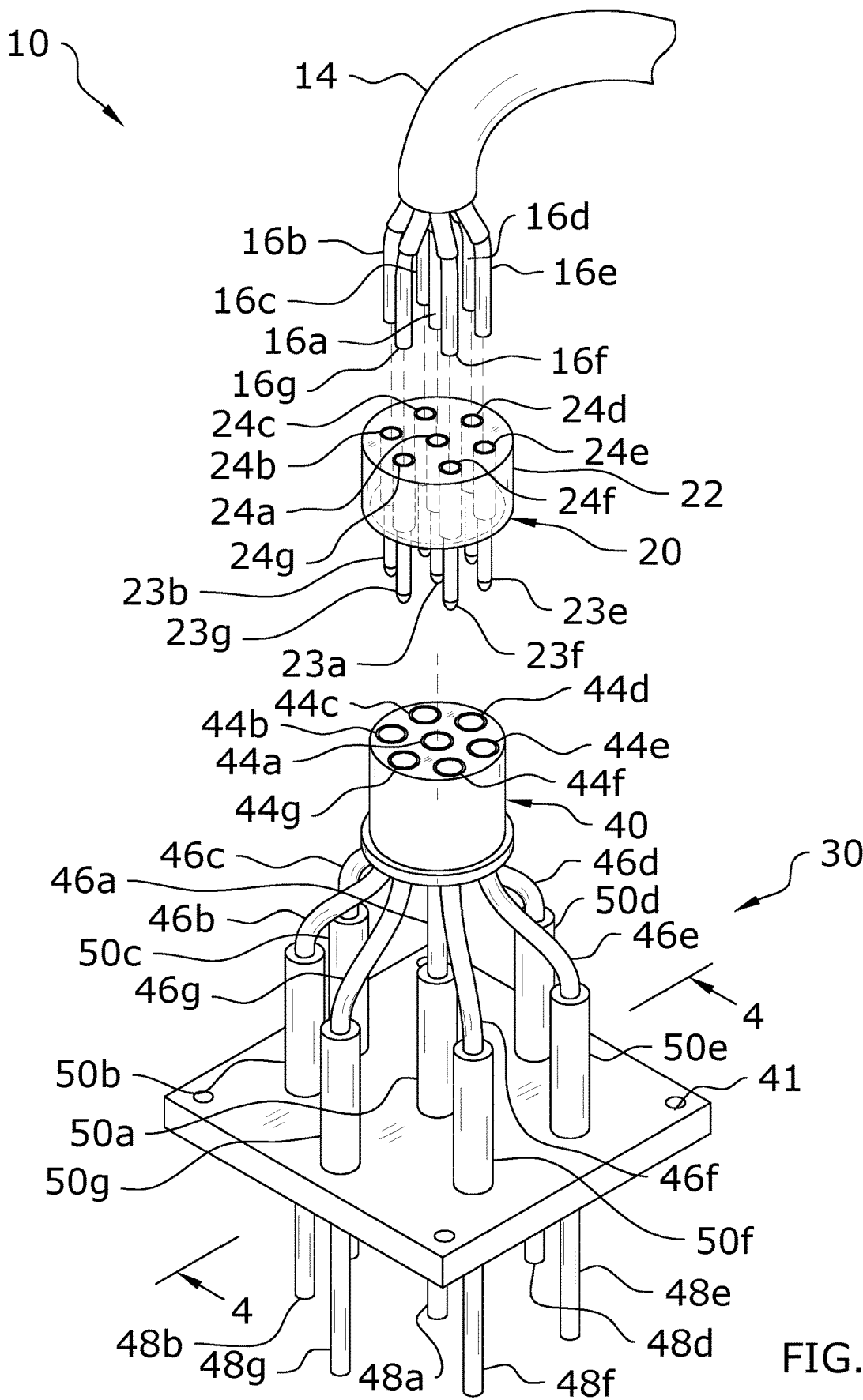
FIG. 3a is an exploded upper perspective view of the heat applicator device, the electrical connector and the wires of a cable to be connected to the connector pins within the electrical connector.
Figure 3B:
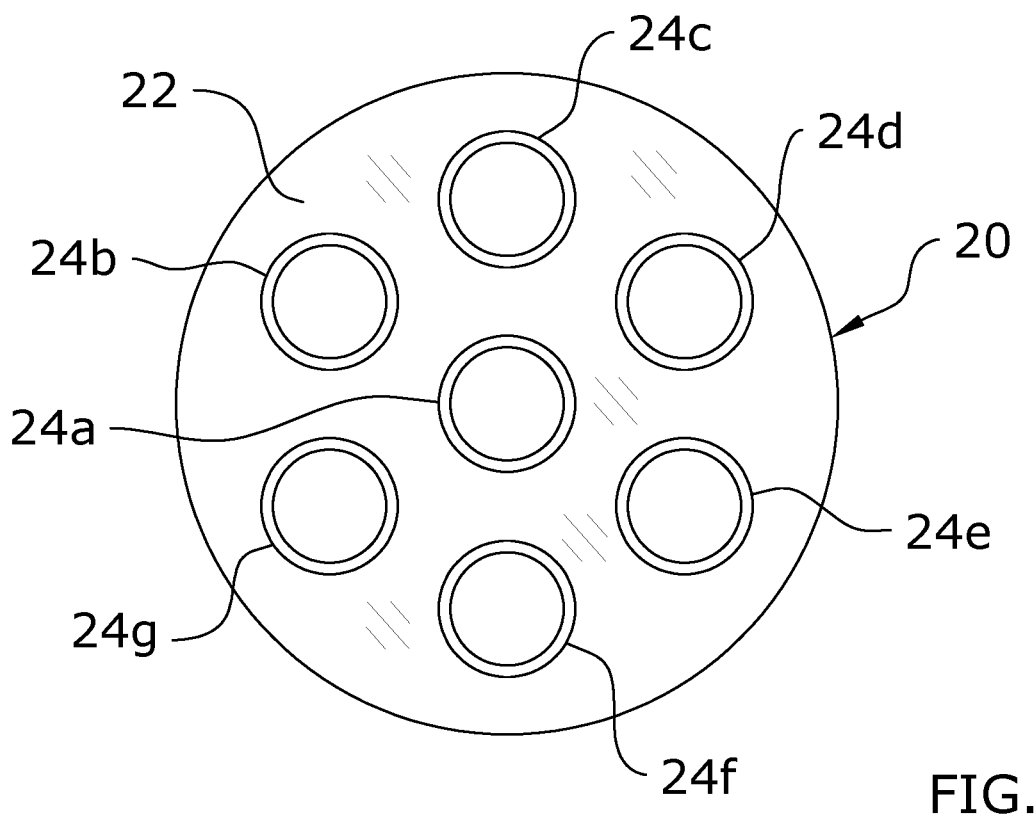
FIG. 3b is a top view of an exemplary electrical connector.
Figure 3C:
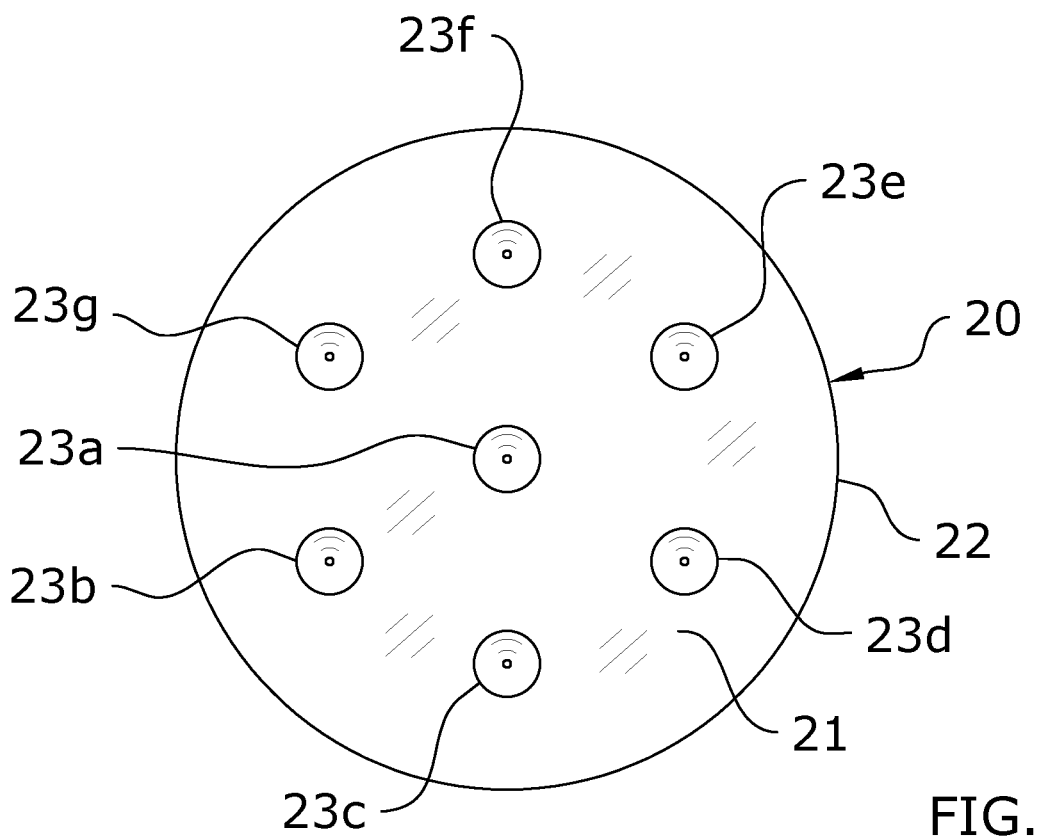
FIG. 3c is a bottom view of an exemplary electrical connector.
Figure 4:
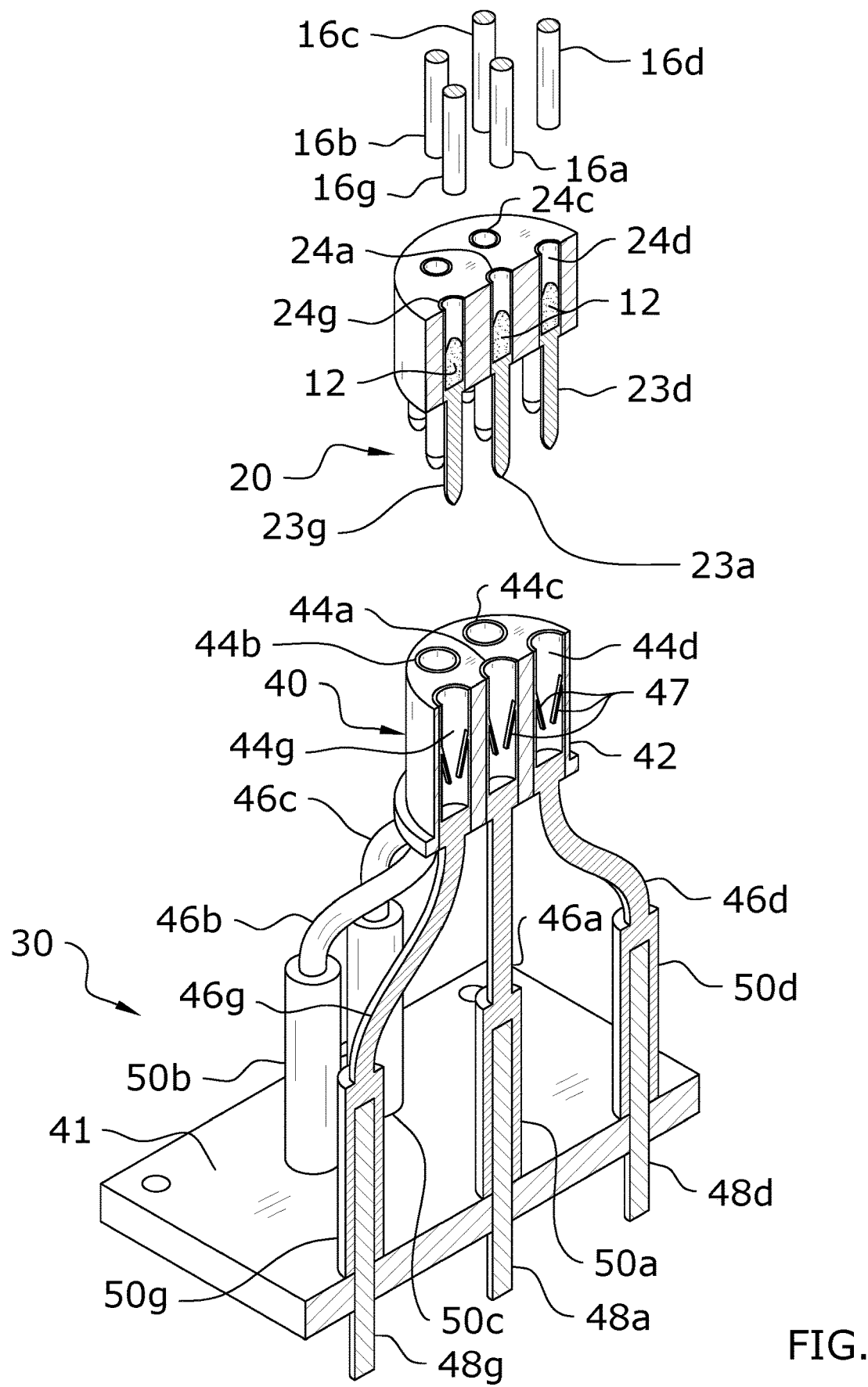

The connector pins 23a-g have a male connecting end that typically has a tapered end or pointed end used to electrically connect the electrical connector 20 to a corresponding electrical socket or the like as best illustrated in FIGS. 3a and 3c of the drawings. The connecting end typically is comprised of a solid pin structure as illustrated in FIG. 4 of the drawings. The male connecting end of the connector pins 23a-g extends outwardly from a first side of the insulator housing 22 as illustrated in FIGS. 2, 3a and 4 of the drawings.

The connector pins 23a-g each include a corresponding connector receptacle 24a-g that is positioned opposite of the male connecting end of the connector pins 23a-g. The distal ends of the wires 16a-g are soldered to the connector receptacles 24a-g according to a pinout to form a physical and electrical connection between the same.

Figure 5A:
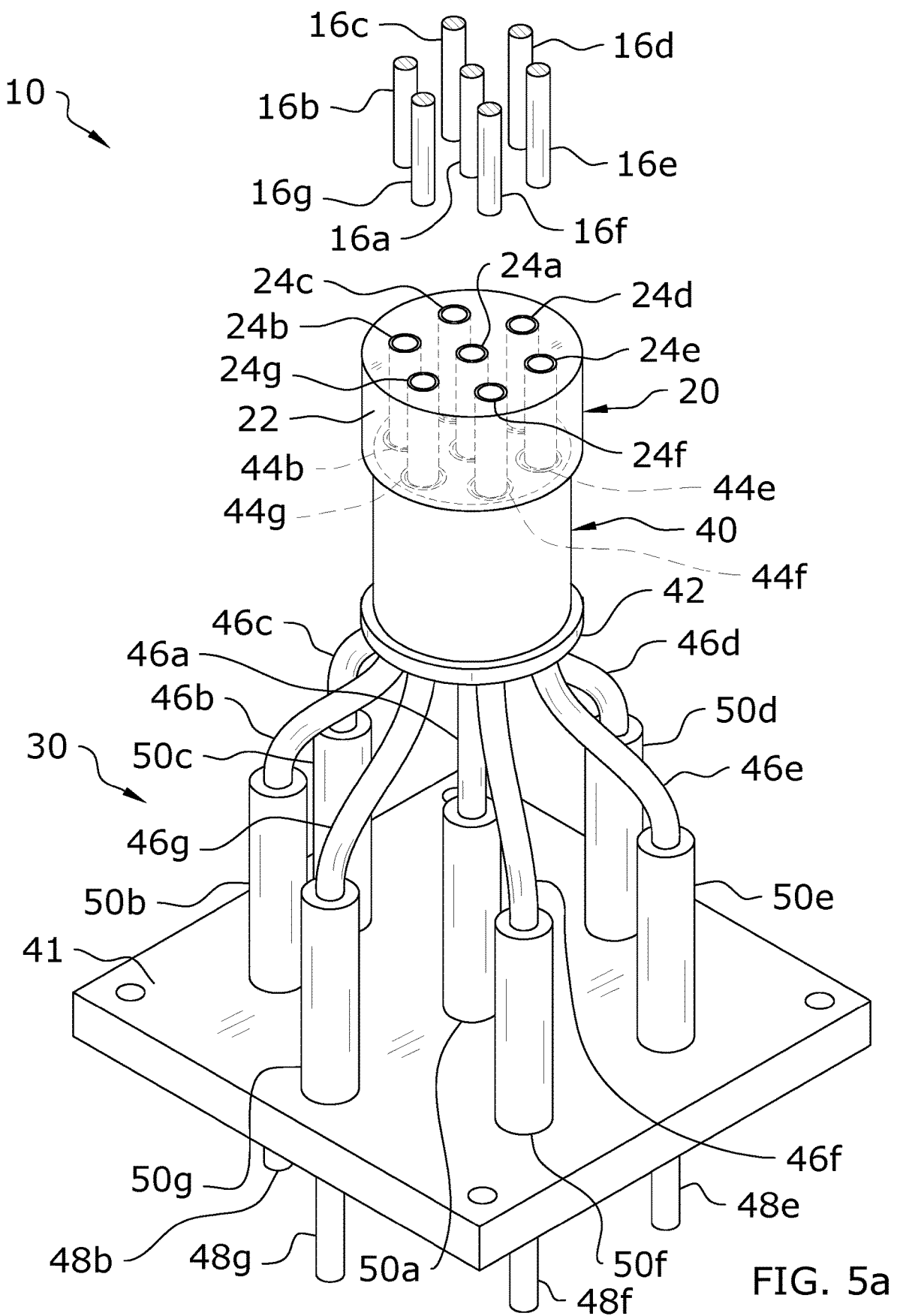
FIG. 5a is an upper perspective view with the electrical connector positioned upon the heat unit.

FIGS. 3a, 3b and 4 illustrate a preferred embodiment of the connector receptacles 24a-g comprised of a female connecting end having a tubular structure. The connector receptacles 24a-g may have a non-tubular structure as long as the connector receptacles 24a-g allow for the soldering of the wires 16a-g. The connector receptacles 24a-g preferably extend outwardly from a second side of the insulator housing 22 of the electrical connector 20 which is opposite of the first side. The connector receptacles 24a-g preferably have an upper opening that may be flush with, recessed or extending past the second side of the insulator housing 22 of the electrical connector 20 as best illustrated in FIG. 4 of the drawings. The connector receptacles 24a-g may all extend the same distance from the second side of the electrical connector 20 as illustrated in FIGS. 3a and 5a of the drawings or the connector receptacles 24a-g may extend outwardly from the second side at different distances (e.g. central located receptacles may extend outwardly further than outer located receptacles).

The connector receptacles 24a-g are preferably prefilled with a solder 12 prior to attaching the electrical connector 20 to the heat applicator device 30 or applying heat to any of the connector pins 23a-g. For example, the interior cavity of the connector receptacles 24a-g may be at least partially filled with solder balls. The prefilling of the connector receptacles 24a-g with solder 12 allows for the electrical connector 20 to be positioned within the heat applicator device 30 and heat to be selectively applied to the connector pins 23a-g without the operator having to manually apply solder 12 to secure the wires 16a-g to the connector receptacles 24a-g.

Various types of solder 12 may be utilized such as but not limited to lead solder, lead-free solder, solder balls, solder paste and flux-core solder. The solder 12 may be comprised of various fusible metal alloys that have a relatively low melting point capable of physically and electrically connecting the wires 16a-g to the connector pins 23a-g of the electrical connector 20.

C. Cable and Wires

FIG. 3a illustrates a cable 14 with a plurality of wires 16a-g extending from the tubular insulation of the cable 14. It can be appreciated that the wires 16a-g to be connected to the electrical connector 20 do not have to be part of an insulated cable 14 and instead may be separate of one another without a common sheathing. The wires 16a-g may have various lengths and sizes.

The plurality of wires 16a-g from the cable 14 are soldered to the respective connector pins 23a-g according to a pinout which cross-references the wires 16a-g to the corresponding connector pins 23a-g. The pinout may be a diagram or chart used to reference the specific connector pins 23a-g and corresponding wires 16a-g. The pinout may be color coded, numbered or otherwise coded to assist a technician in positioning the wires 16a-g adjacent to and upon their respective connector pins 23a-g for proper connection of the wires 16a-g to the connector pins 23a-g. Incorrect connection of any wire to the electrical connector 20 can result in the complete loss of the electrical connector 20.

D. Heat Applicator Device

FIGS. 1a through 5h and 9 illustrate an exemplary heat applicator device 30 utilized to apply heat to the individual connector pins 23a-g sufficient to melt the solder 12 (e.g. 190 degrees F. or greater) into a liquid state and thereby resulting in the soldering of the wires 16a-g to the connector pins 23a-g. The heat applicator device 30 may be a portable device or a non-movable fixture.

Figure 1A:
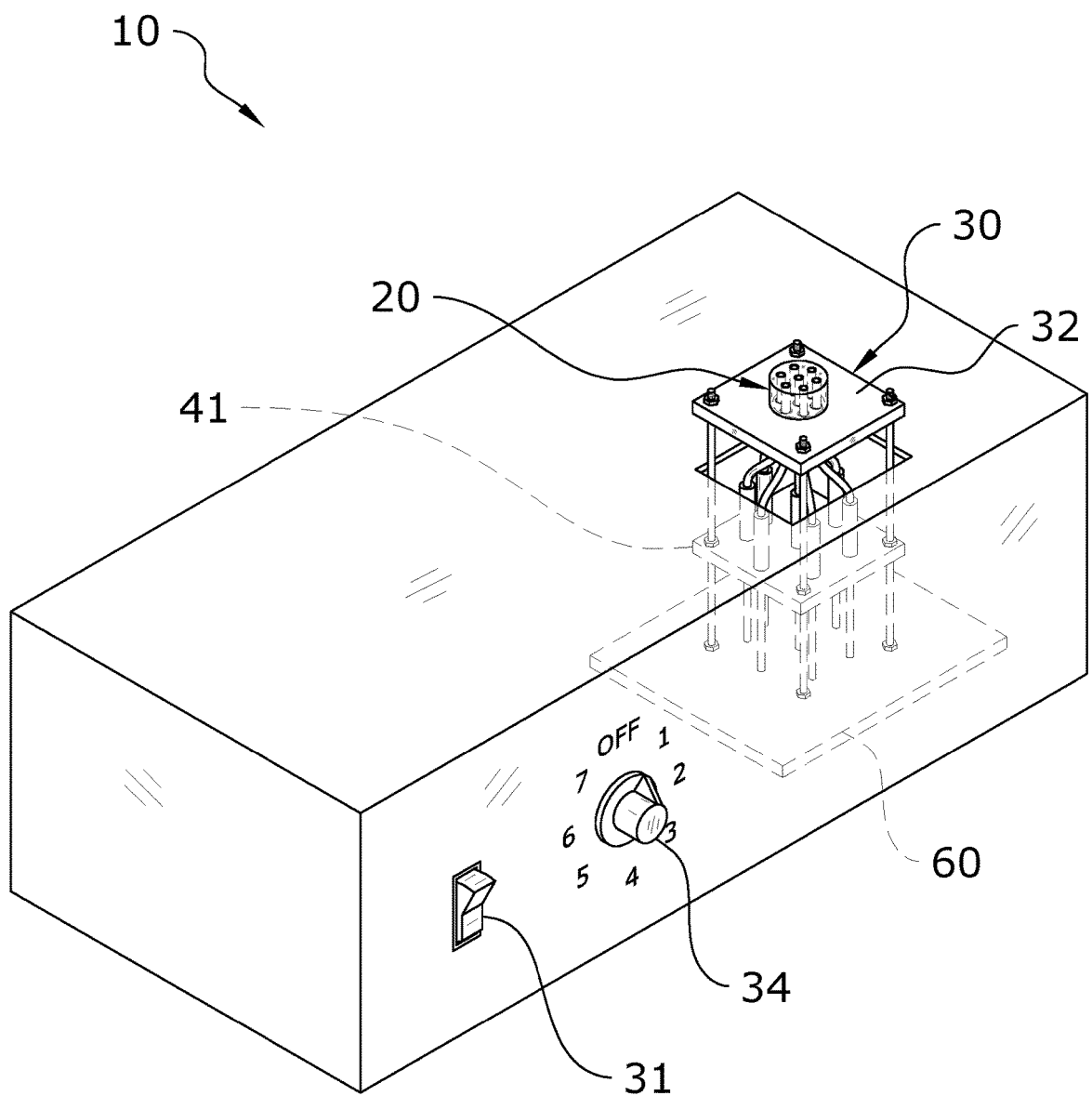
FIG. 1a is an upper perspective view of the present invention with an electrical connector positioned within the heat unit.

The heat applicator device 30 includes a power switch 31 that a user uses to turn the heat applicator device 30 on/off as illustrated in FIG. 1a of the drawings. The heat applicator device 30 further preferably includes a control switch 34 that the technician manipulates to control which connector pin 23a-g is heated and for how long.

Figure 1B:
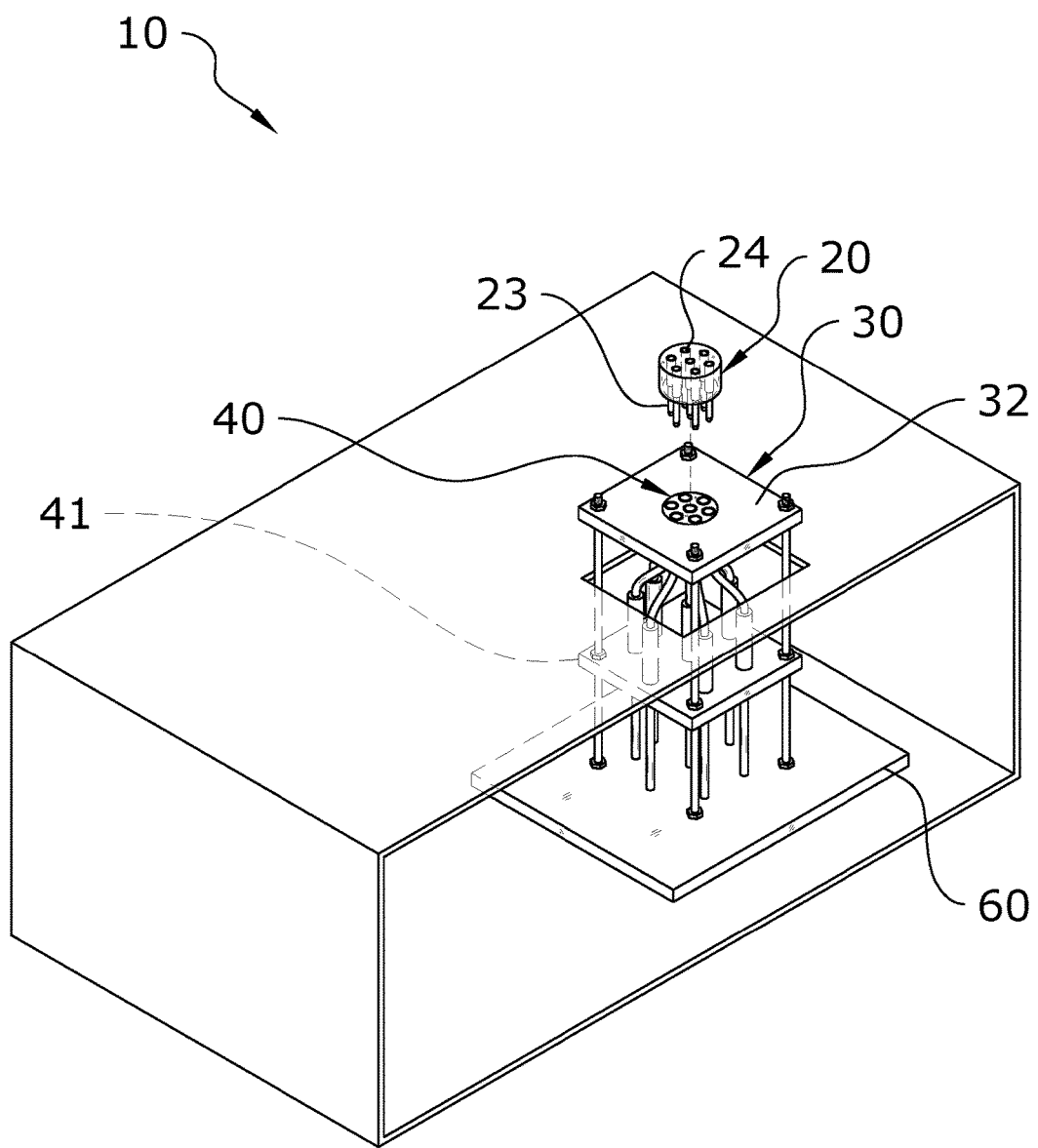
FIG. 1b is an upper perspective view of the present invention with a portion of the housing removed and the electrical connector removed from the heat unit.
Figure 18:
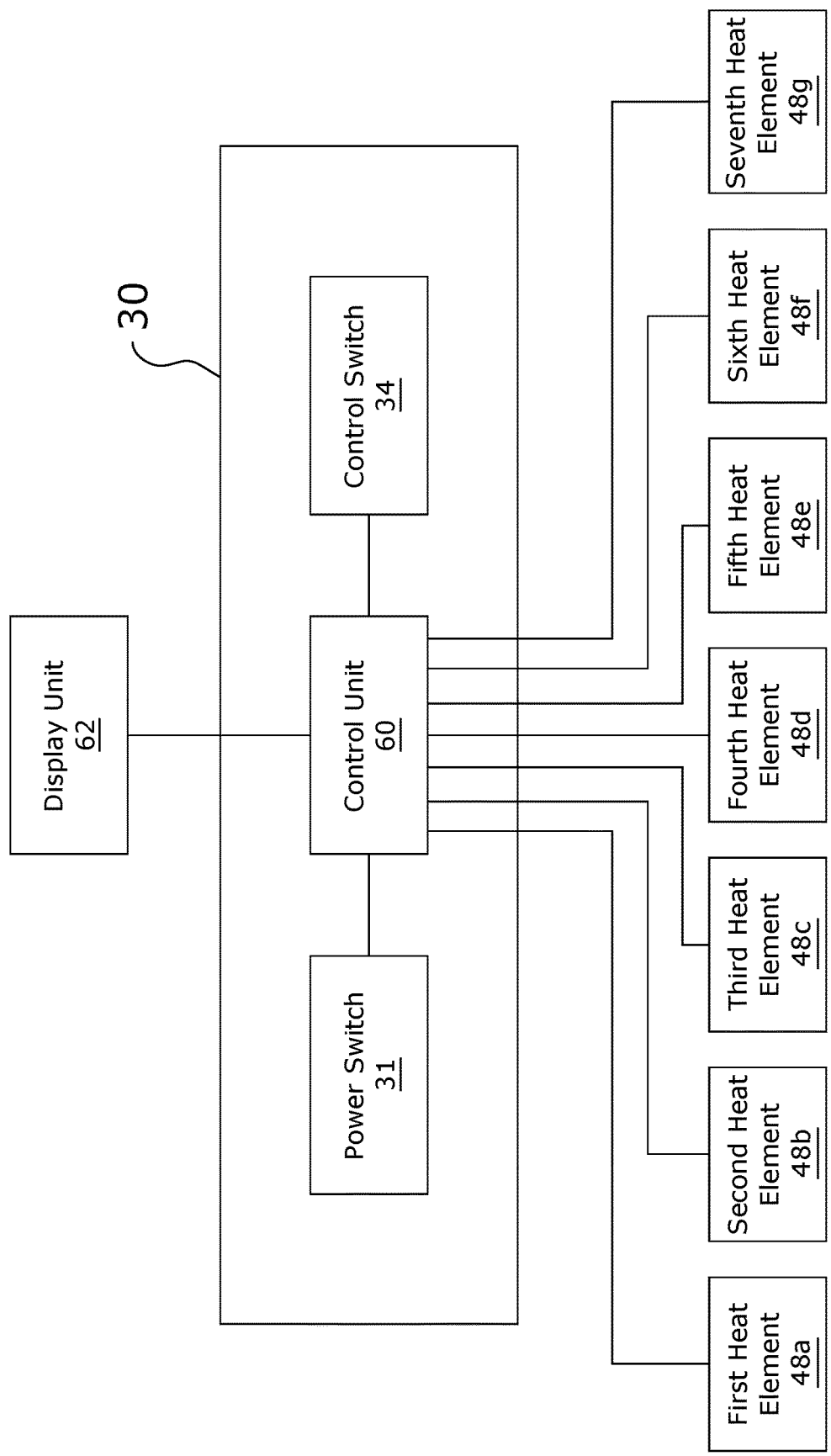
FIG. 18 is a block diagram illustrating the control unit in communication with the display unit and the heat applicator device.

As illustrated in FIGS. 1a through 2 of the drawings, the heat applicator device 30 is comprised of an upper support member 32 (e.g. platform) that supports a heating unit 40 that the electrical connector 20 physically and thermally connects to. The heat applicator device 30 further is comprised of a lower support member 41 that supports the heat elements 48a-g. The upper support member 32 and the lower support member 41 preferably are comprised of a heat resistant material. The upper support member 32 is supported above the lower support member 41 with a plurality of support members extending between the upper support member 32 and the lower support member 41. The heat elements 48a-g are electrically connected to the heat applicator device 30 and the control unit 60 as illustrated in FIGS. 1b, 2 and 18 of the drawings.

The heat elements 48a-g used in the present invention are comprised of any device capable of generating heat sufficient to melt solder 12 such as but not limited to ceramic heating elements. The heat elements 48a-g may generate heat via electricity or other heating option. The heat elements 48a-g pass through the lower support member 41 and upwardly as best illustrated in FIG. 4 of the drawings.

Figure 10A:
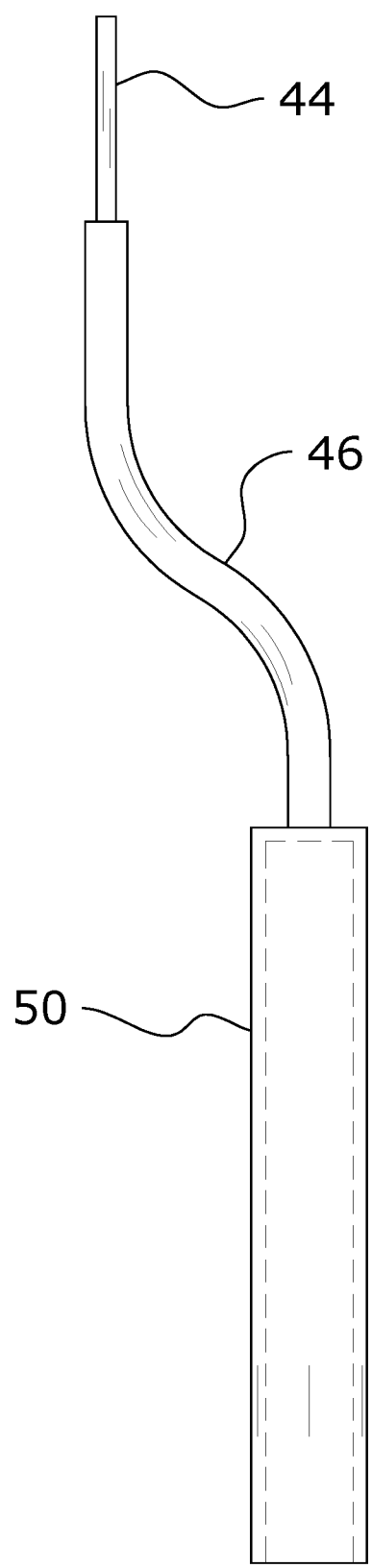
FIG. 10a is a side view of a heat conductor thermally connected between a tubular thermal connector and a heat receptacle.
Figure 10B:
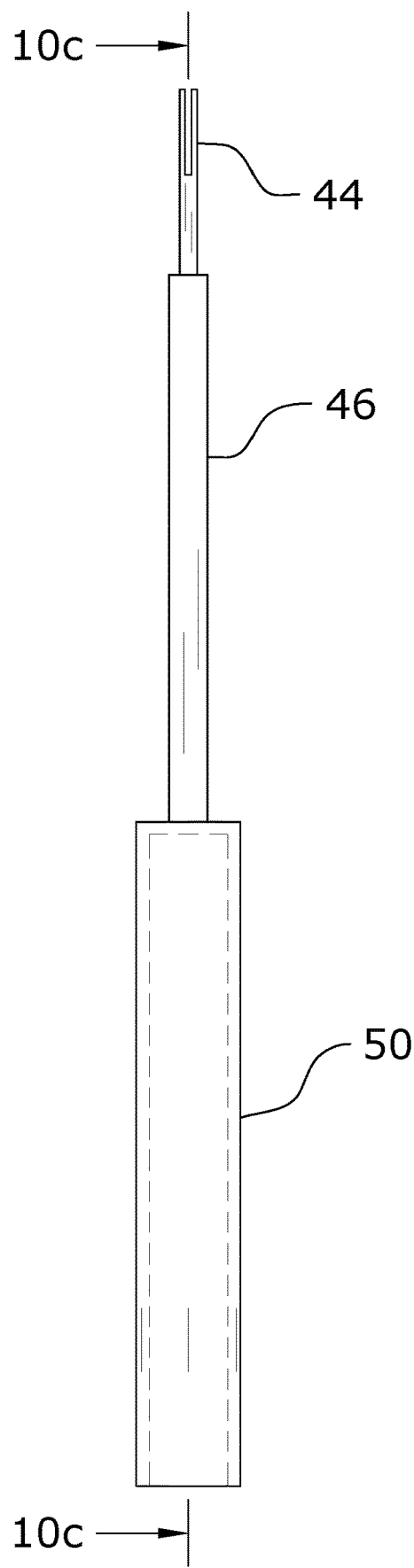
FIG. 10b is front view of the heat conductor thermally connected between the tubular thermal connector and the heat receptacle.
Figure 10C:
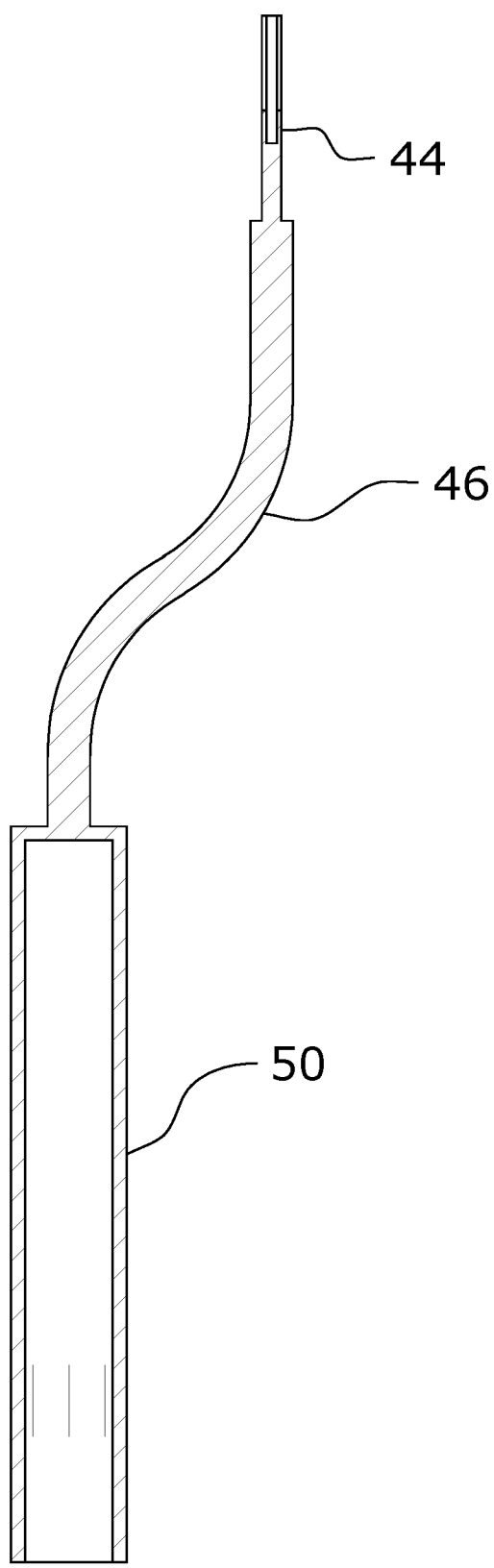
FIG. 10c is a cross sectional view taken along line 10c-10c of FIG. 10b.
Figure 11A:
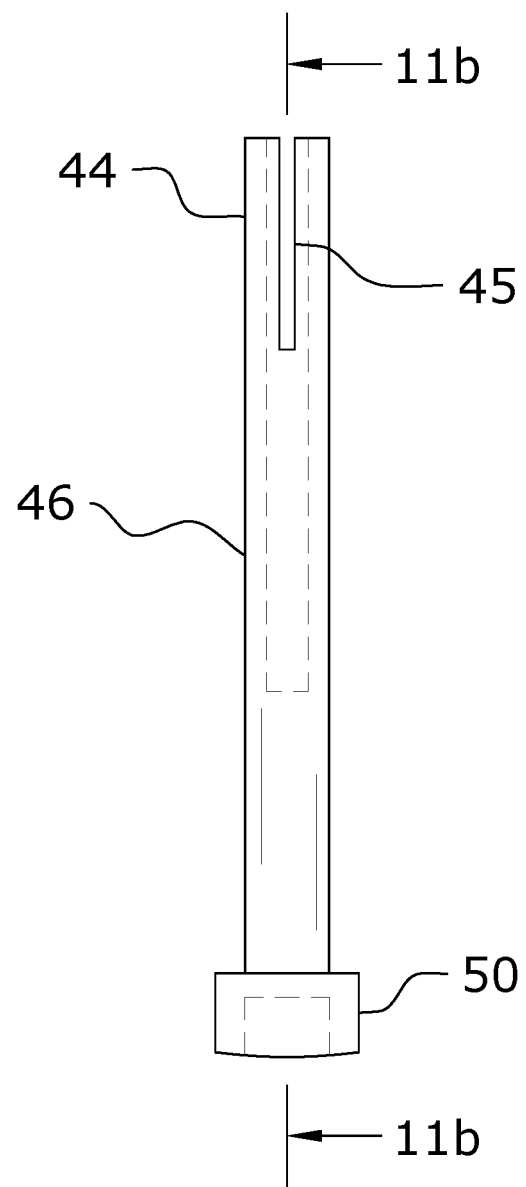
FIG. 11a is a side view of a heat receptacle.
Figure 11B:
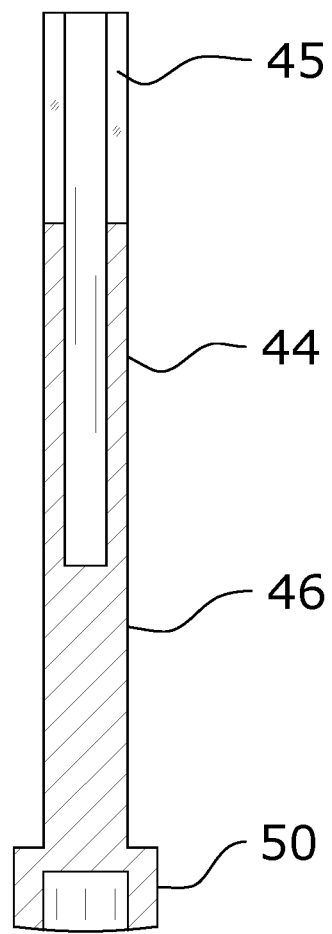

A corresponding plurality of thermal connectors 50a-g are in thermal contact with the heat elements 48a-g to conduct the heat generated by the heat elements 48a-g. The thermal connectors 50a-g are preferably comprised of a heat conductive metal such as copper. The thermal connectors 50a-g are further preferably comprised of a tubular structure that snugly surrounds the heat elements 48a-g to increase the surface area contact with the heat elements 48a-g as best illustrated in FIGS. 4 and 10c of the drawings.

A plurality of heat conductors 46a-g are physically and thermally connected to the thermal connectors 50a-g as shown in FIGS. 2, 3a, 4 and 5a of the drawings. The heat conductors 46a-g are also preferably comprised of a heat conductive metal such as copper to transfer the heat conducted by the thermal connectors 50a-g to the heat receptacles 44a-g within the heating unit 40. The heat conductors 46a-g are further preferably comprised of an elongated bendable structure to allow for forming of the path of the heat conductors 46a-g to fit with the heating unit 40 of the heat applicator device 30. FIGS. 2, 3a, 4 and 5a best illustrate how the heat conductors 46a-g are bent inwardly toward the lower end of the heating unit 40 to thermally connect to corresponding heat receptacles 44a-g within the heating unit 40. This allows for larger sized heating elements and thermal connectors 50a-g to be used while providing the flexibility required to create the desired pattern of heat receptacles 44a-g within the heating unit 40 to match smaller sized electrical connectors 20.

The heat receptacles 44a-g are physically and thermally connected to the heat conductors 46a-g opposite of the thermal connectors 50a-g as illustrated in FIG. 4 of the drawings. Each of the heat receptacles 44a-g is preferably connected to only one of the heat conductors 46a-g. The heat receptacles 44a-g are preferably comprised of a heat conductive metal such as copper to effectively transfer the heat from the heat conductors 46a-g to the connector pins 23a-g of the electrical connector 20 positioned within the heating unit 40. The plurality of heat receptacles 44a-g are each preferably concentrically aligned with a corresponding connector pin of the plurality of connector pins 23a-g.

The heat receptacles 44a-g preferably are comprised of a tubular structure adapted to receive the connector pins 23a-g of the electrical connector 20. The heat receptacles 44a-g may have various cross sectional shapes such as circular, square, rectangular or oval. The heat receptacles 44a-g may be comprised of a non-tubular structure (e.g. flat, concave, etc.). The heating unit 40 further preferably includes an insulated housing 42 that the heat receptacles 44a-g are positioned within, however, the heat receptacles 44a-g may also be directly positioned within the upper support member 32.

The pattern for the heat receptacles 44a-g matches the pattern of the connector pins 23a-g so that the electrical connector 20 may be connected to the heating unit 40 by the connector pins 23a-g. As can be appreciated, the heat receptacles 44a-g within the heating unit 40 may be comprised of any type of pattern and any number. For example, FIG. 3a illustrates seven heat receptacles 44a-g within the heating unit 40 with a center heat receptacle 44a surrounded in a circular pattern by the other receptacles 44b-g. It is preferable that the heat receptacles 44a-g, the corresponding heat conductors 46a-g and the corresponding thermal connectors 50a-g are each comprised of a unitary structure without any thermal barriers comprised of the same material such as metal (e.g. copper) as best illustrated in FIGS. 4 and 10c of the drawings.

Figure 12A:
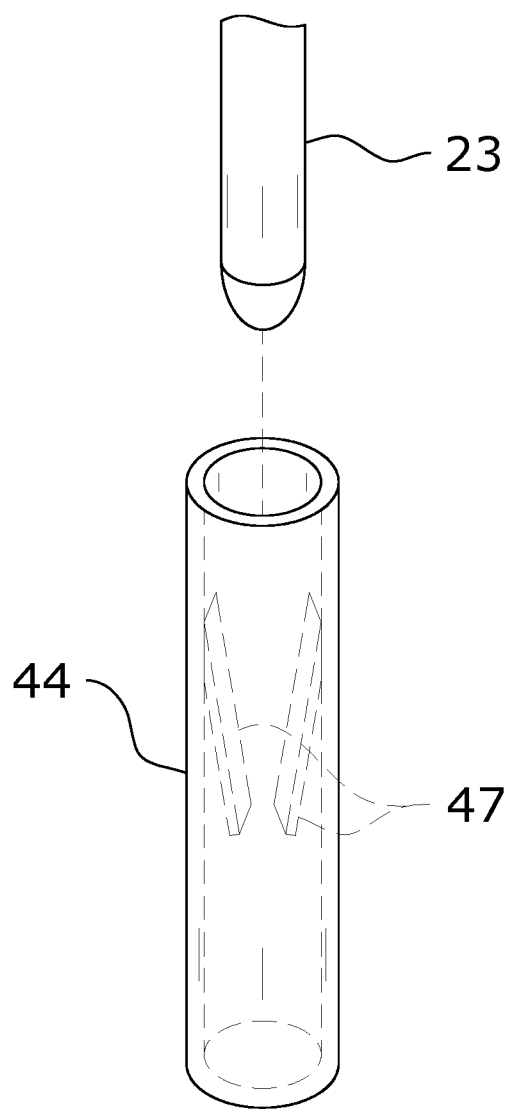
FIG. 12a is an exploded upper perspective view of a heat receptacle with contact clips.
Figure 12B:
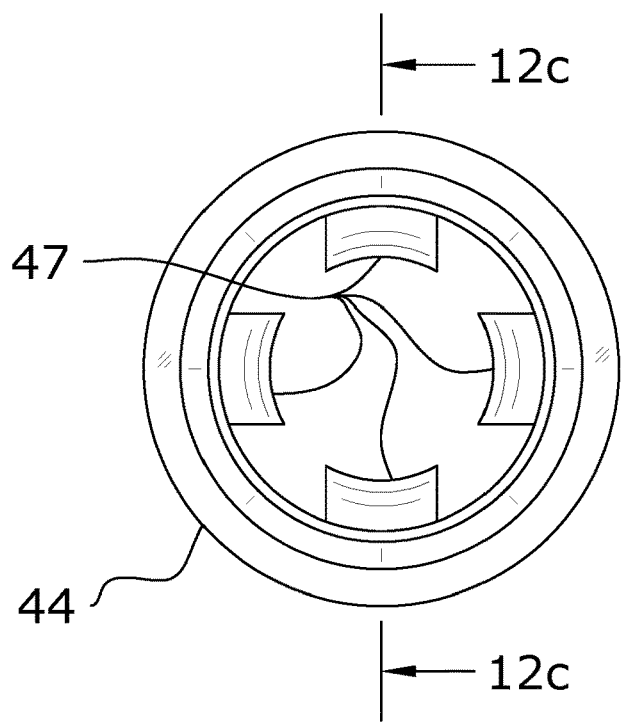
FIG. 12b is an end view of a heat receptacle having a plurality of contact clips.
Figure 12C:
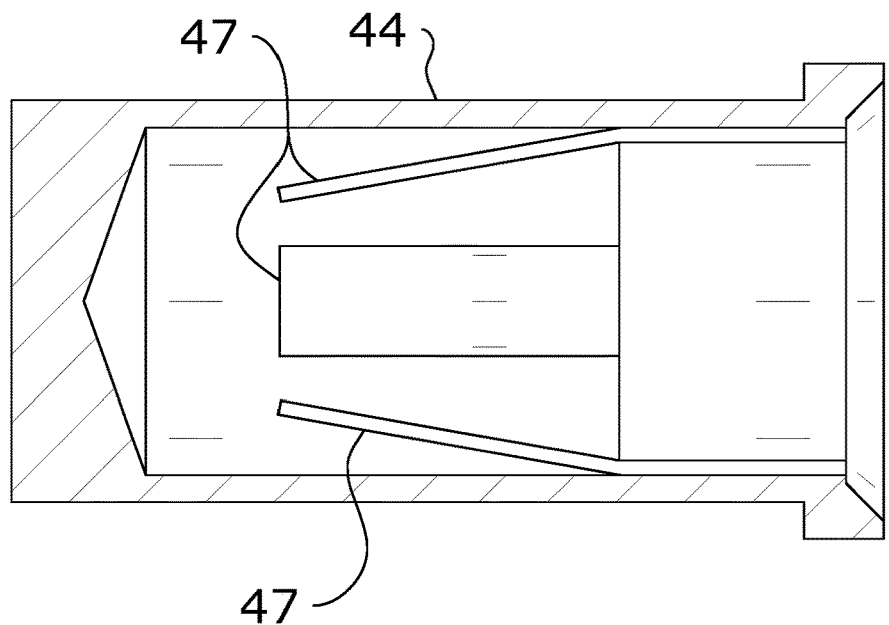
FIG. 12c is a cross sectional view taken along line 12c-12c of FIG. 12b.

The heat receptacles 44a-g may have a tubular structure wherein the interior passage of the heat receptacles 44a-g is slightly larger than the outer diameter/width of the connector pins 23a-g to allow for physical engagement of the connector pins 23a-g by the interior surface of the heat receptacles 44a-g. In addition, the heat receptacles 44a-g may include one or more contact clips 47 that extend inwardly from the interior wall of the heat receptacles 44a-g as illustrated in FIGS. 2 through 8c, 12a, 12b and 12c. The distal ends and/or the cross sectional shape of the contact clips 47 may also have an inwardly curved structure to increase the surface contact of the contact clips 47 with the connector pins 23a-g as best illustrated in FIG. 12b of the drawings. The contact clips 47 are preferably angled downwardly away from the opening of the heat receptacles 44a-g as illustrated in FIG. 4 of the drawings. When the connector pins 23a-g are inserted into the heat receptacles 44a-g, the contact clips 47 flex towards the inner wall of each of the heat receptacles 44a-g while ensuring a constant thermal connection with each of the connector pins 23a-g of the electrical connector 20.

Figure 15:
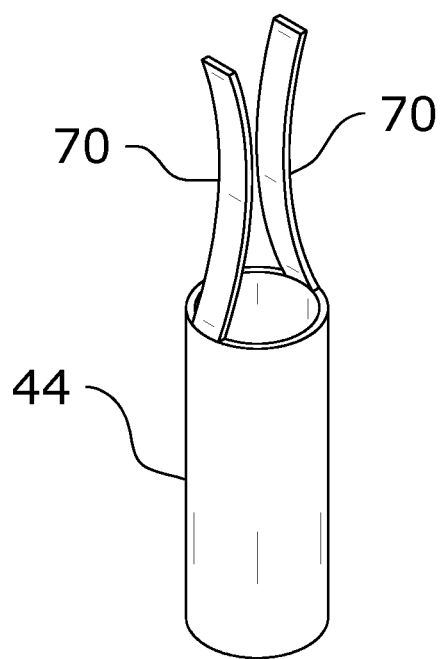
FIG. 15 is an upper perspective view of a heat receptacle having a pair of prongs.
Figure 16:
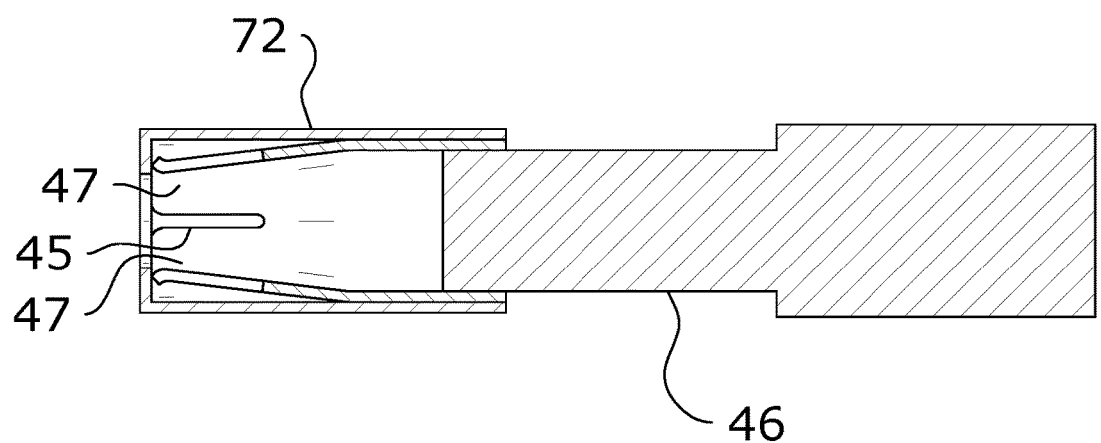
FIG. 16 is a side cross sectional view of another variation of the heat receptacle having contact clips and a hood.

As a related embodiment, the contact clips 47 may be connected to a tubular structure that is positioned over the heat conductor 46 with a hood 72 having a concentric opening positioned over the contact clips 47 as illustrated in FIG. 16. As another related embodiment, FIG. 15 illustrates a pair of prongs 70 extending outwardly from the heat receptacle instead of using contact clips 47 within the interior of the heat receptacle.

Figure 13A:
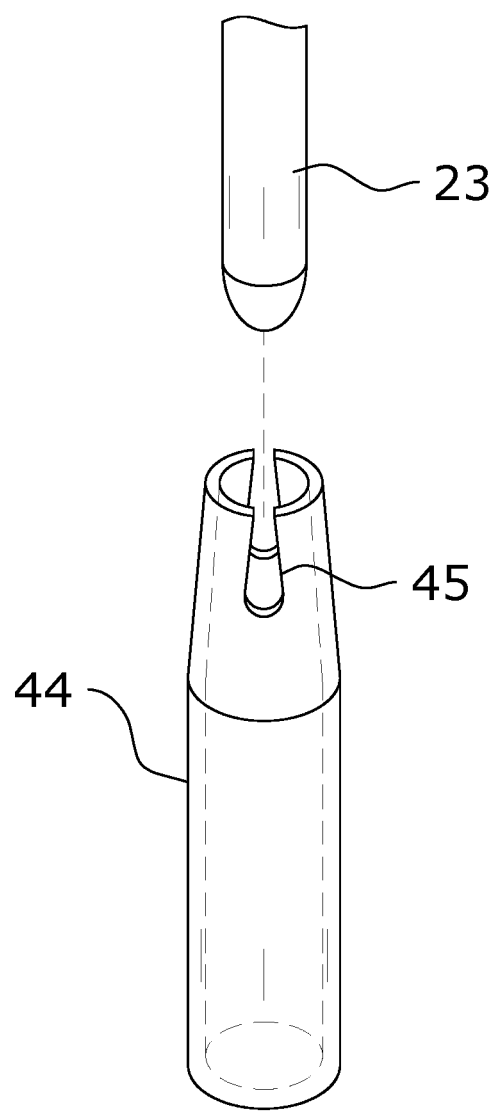
FIG. 13a is an upper perspective view of another variation of the heat receptacle.
Figure 13B:
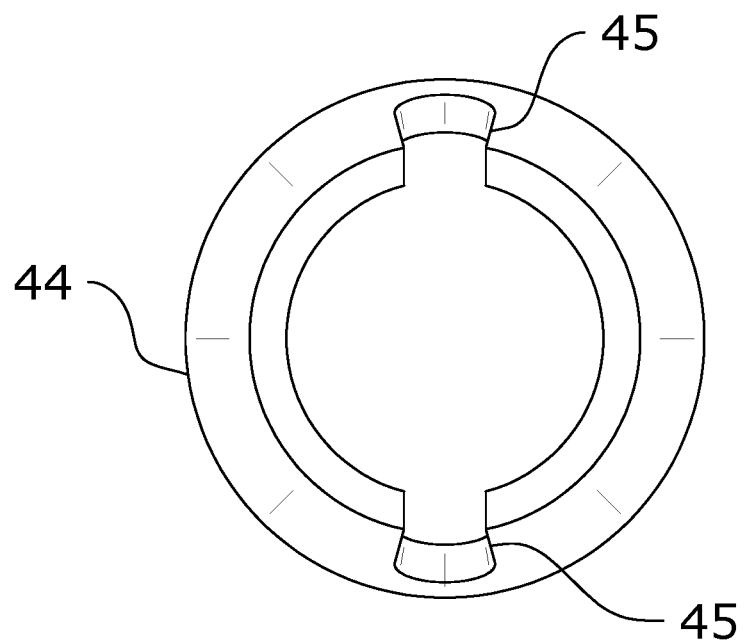
Figure 13C:
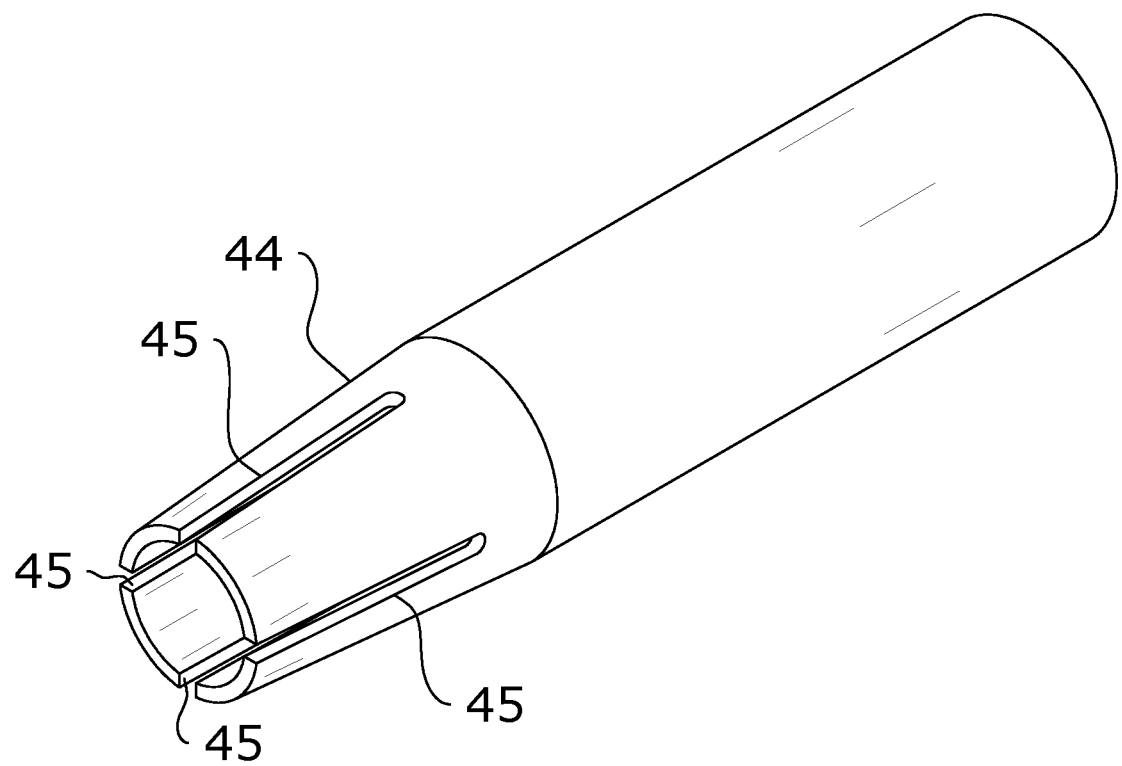
FIG. 13c is an upper perspective view of the variation of the heat receptacle shown in FIG. 13a with additional cutouts.

FIGS. 10a through 11b illustrate an alternative heat receptacle 44 in thermal communication with the heat conductor 46, wherein the heat conductor 46 is in thermal communication with the corresponding thermal connector. The heat receptacle 44 illustrated in FIGS. 10a through 11b and 13a through 13c includes one or more cutouts 45 that extend longitudinally within the tubular structure of the heat receptacle 44 thereby allowing the distal portion of the heat receptacle 44 to physically and thermally engage the outer surface of the connector pin while providing sufficient expansion of the heat receptacle 44. The distal portion of the heat receptacle 44 may be straight as shown in FIGS. 10a through 11b or tapered inwardly as illustrated in FIGS. 13a through 13c. The cutouts 45 preferably only extend partially along the length of the heat receptacle 44 from the distal end thereof, however, the cutouts 45 may extend along the entire length of the heat receptacle 44.

Figure 14:
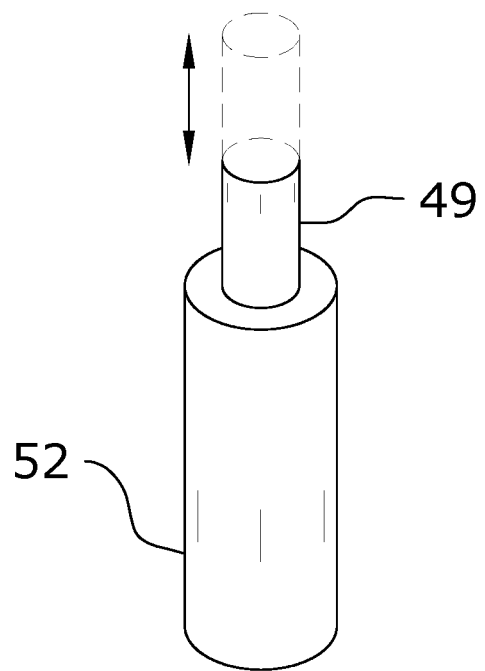
FIG. 14 is an upper perspective view of a heat device having a telescoping pin.

FIG. 14 illustrates wherein the heat receptacles 44a-g are comprised of heat devices 52 having a pogo-pin structure that utilizes a telescoping pin 49 that is biased upwardly and that physically engages the connector pin. Each of the heat receptacles 44a-g is comprised of the structure of the heat device 52 and are positioned beneath the connector pins 23a-g of the electrical connector 20 to ensure direct physical and thermal contact for each of the connector pins 23a-g despite any difference in length for the connector pins 23a-g.

Figure 9:
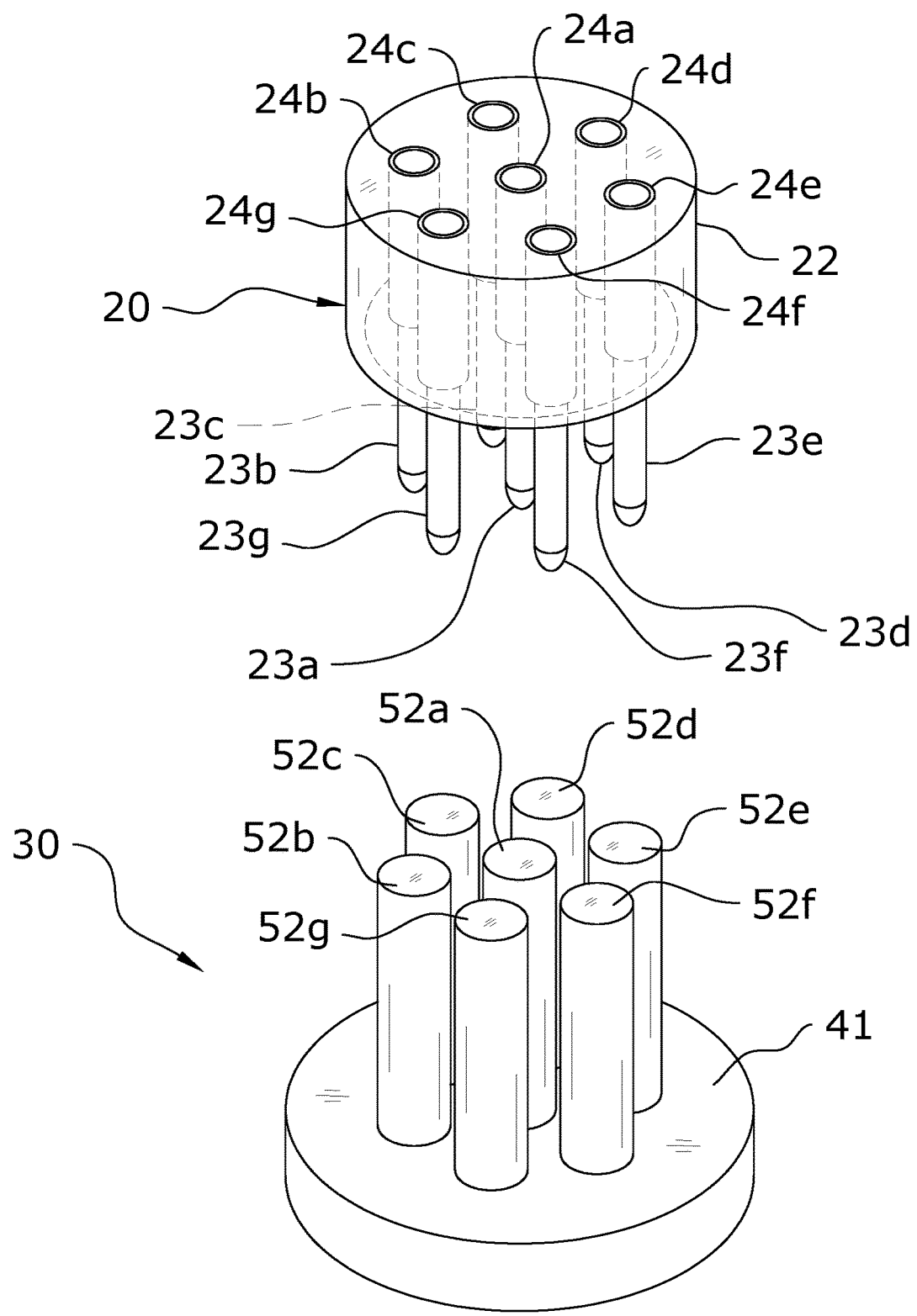
FIG. 9 is an upper perspective view of a plurality of heat devices that apply heat to selected connector pins of the electrical connector from a distance without direct physical contact.

FIG. 9 illustrates a plurality of heat devices 52 that do not physically connect with the connector pins 23a-g but direct heat to specific opposing connector pins 23a-g. For example, the heat devices 52 may be comprised of a laser (e.g. nitrogen laser) that directs laser light to a specific one of the connector pins 23a-g to heat the same.

E. Control Unit

The control unit 60 may be comprised of any type of circuit board or computer for practicing the various aspects of the present invention. For example, the control unit 60 can be a personal computer (e.g. APPLE® based computer, an IBM based computer, or compatible thereof) or tablet computer (e.g. IPAD®). The control unit 60 may also be comprised of various other electronic devices capable of sending and receiving electronic data including but not limited to smartphones, mobile phones, telephones, personal digital assistants (PDAs), mobile electronic devices, handheld wireless devices, smart phones and video viewing units.

The control unit 60 controls the operation of the present invention. In particular, the control unit 60 controls which of the heat elements 48a-g is turned on or off. The control unit 60 is in communication with a power switch 31 which turns the present invention on/off as illustrated in FIG. 18. The control unit 60 further is preferably in communication with a control switch 34 which allows the user to manually control which of the heat elements 48a-g is activated to produce heat.

FIG. 1a illustrates an exemplary control switch 34 comprised of a turn-knob electrical switch having a plurality of positions that each represent the activation of one of the heat elements 48a-g and an off position. For example, FIG. 1a illustrates 8 positions for the control switch 34: OFF, 1, 2, 3, 4, 5, 6 and 7. Position "Off" deactivates electrical power to all of the heat elements 48a-g, position 1 activates the first heat element 48a, position 2 activates the second heat element 48b, position 3 activates the third heat element 48c, position 4 activates the fourth heat element 48d, position 5 activates the fifth heat element 48e, position 6 activates the sixth heat element 48f and position 7 activates the seventh heat element 48g. As can be appreciated, the number of positions for the control switch 34 corresponds to the number of heat elements 48a-g to be controlled.

The control switch 34 may also be comprised of a toggle device or a foot pedal that simply advances the heating of the heat elements 48a-g each time the control switch 34 is depressed. For example, in the initial state the control unit 60 is off until the user depresses the control switch 34 which then activates the first heat element 48a. When the user releases the control switch 34, the first heat element 48a is deactivated. When the user depresses the control switch 34 a second time, the second heat element 48b is activated and when the user thereafter releases the control switch 34 the second heat element 48 is deactivated and so forth until all of the heat elements 48a-g have been activated to heat the corresponding connector pins 23a-g.

Instead of operating manually via a control switch 34, the control unit 60 may operate automatically by automatically controlling which of the heat elements 48a-g are activated. For example, the control unit 60 may automatically activate the first heat element 48a for a period of time (e.g. 5 seconds) and/or until a specific temperature is reached sufficient to heat the corresponding heat receptacle sufficiently to melt the solder 12 within the corresponding connector receptacle and allow the technician to insert the corresponding first wire 16a into the first connector receptacle 24a. After the period of time, the control unit 60 automatically deactivates the first heat element 48a and then automatically activates the second heat element 48b for a period of time and/or a specific temperature is reached similar to the first heat element 48a and then deactivates the second heat element 48b after a period of time. This process continues for the remaining heat elements 48a-g until all of the wires 16a-g are fully inserted and connected within the electrical connector 20. It is preferable that visual and/or audio indicators are provided to the technician indicating when to insert a specific wire 16a-g into a corresponding connector receptacle 24a-g.

Various sensors may be in communication with the control unit 60 such as but not limited to temperature sensors that detect the temperature of the heat elements 48a-g, the thermal connectors 50a-g, the heat conductors 46a-g, the heat receptacles 44a-g, the connector pins 23a-g, the connector receptacles 24a-g, solder 12 within the connector receptacles 24a-g and/or the wires 16a-g. The control unit 60 may use the data received by the sensors in controlling the operation of the present invention and may display the same on the display unit 62.

The control unit 60 is further preferably in communication with a display unit 62 (e.g. display screen or monitor) to display various types of information. For example, the control unit 60 may display the following types of information on the display unit 62: status of the heat applicator device 30 (e.g. On, Off), the position of the control switch 34, an indication of which connector pin is being heated, the connector pin within the electrical connector 20 that has heat applied thereto, a graphical representation of the connector pin having heat applied thereto, a graphical representation of a selected wire for the technician to insert into a selected heated connector pin, the amount of time heat has been applied to a connector pin, the temperature of a heat receptacle, the temperature of a connector pin and the like.

The control unit 60 may be comprised of any conventional computer or similar electronic device. A conventional computer preferably includes a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the present invention. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor, together with an operating system, operate to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

F. Operation of $1^{st}$ Embodiment

Figure 17:
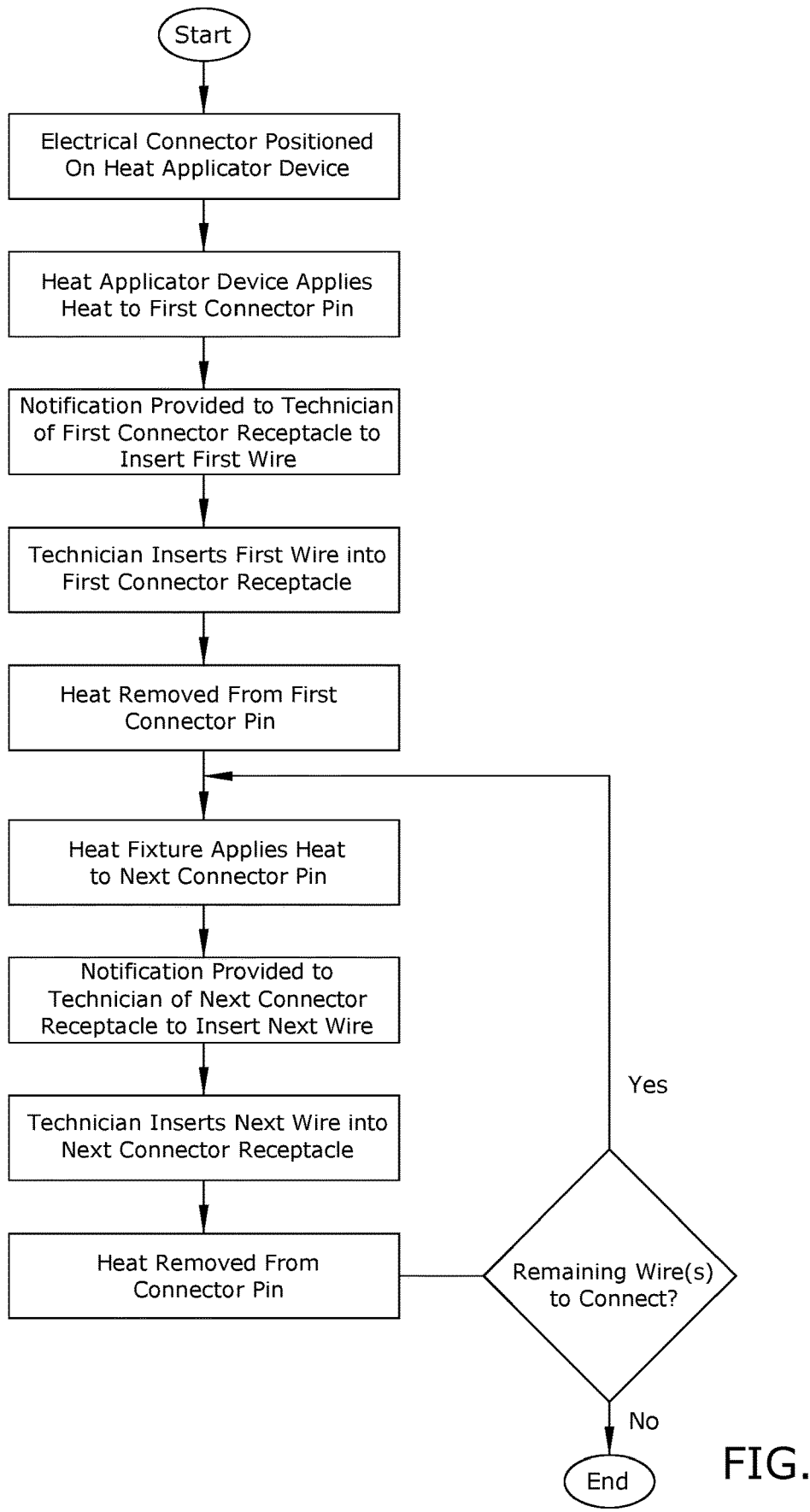
FIG. 17 is a flowchart illustrating the overall functionality of the present invention.

FIG. 17 provides an overview of the present invention. As illustrated in FIGS. 1a and 5a of the drawings, the technician first connects the electrical connector 20 to the heat applicator device 30 by inserting the connector pins 23a-g into the heat receptacles 44a-g of the heating unit 40. Once the electrical connector 20 is properly connected to the heat applicator device 30, the user then turns on the heat applicator device 30.

Figure 5B:
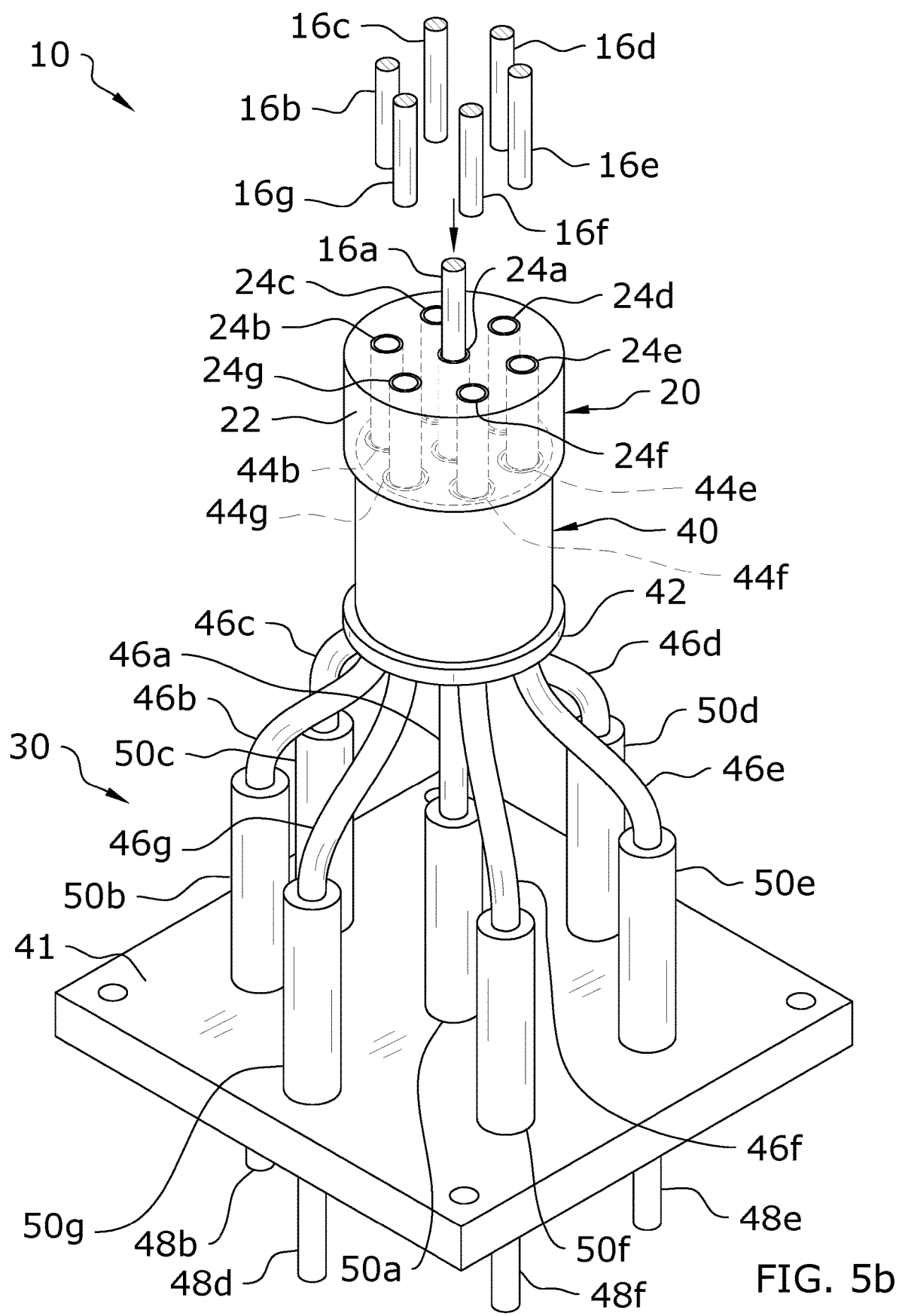
FIG. 5b is an upper perspective view of the electrical connector positioned upon the heat unit with a first wire inserted into a first connector receptacle.
Figure 5C:
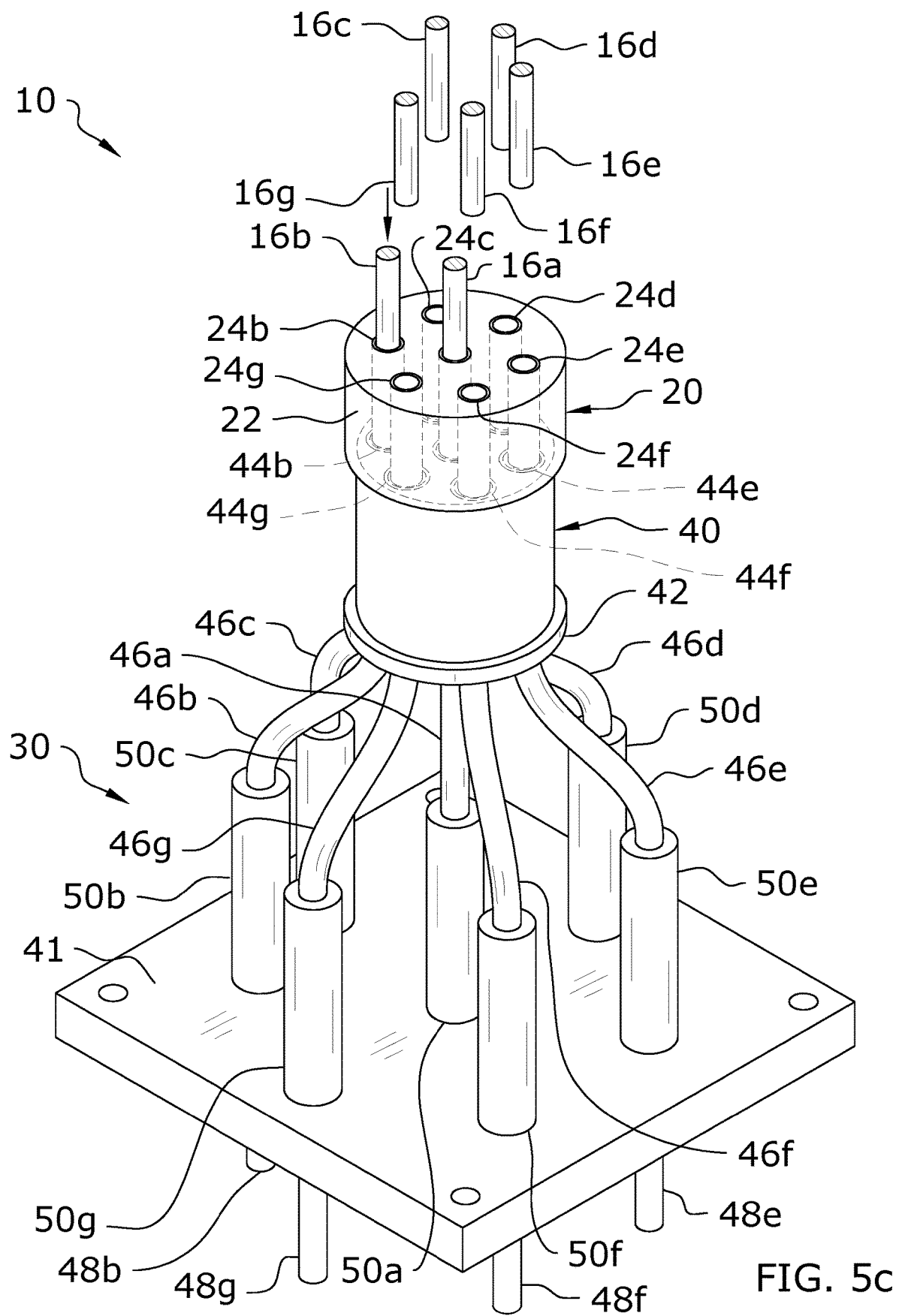
FIG. 5c is an upper perspective view of the electrical connector positioned upon the heat unit with a second wire inserted into a second connector receptacle.
Figure 5D:
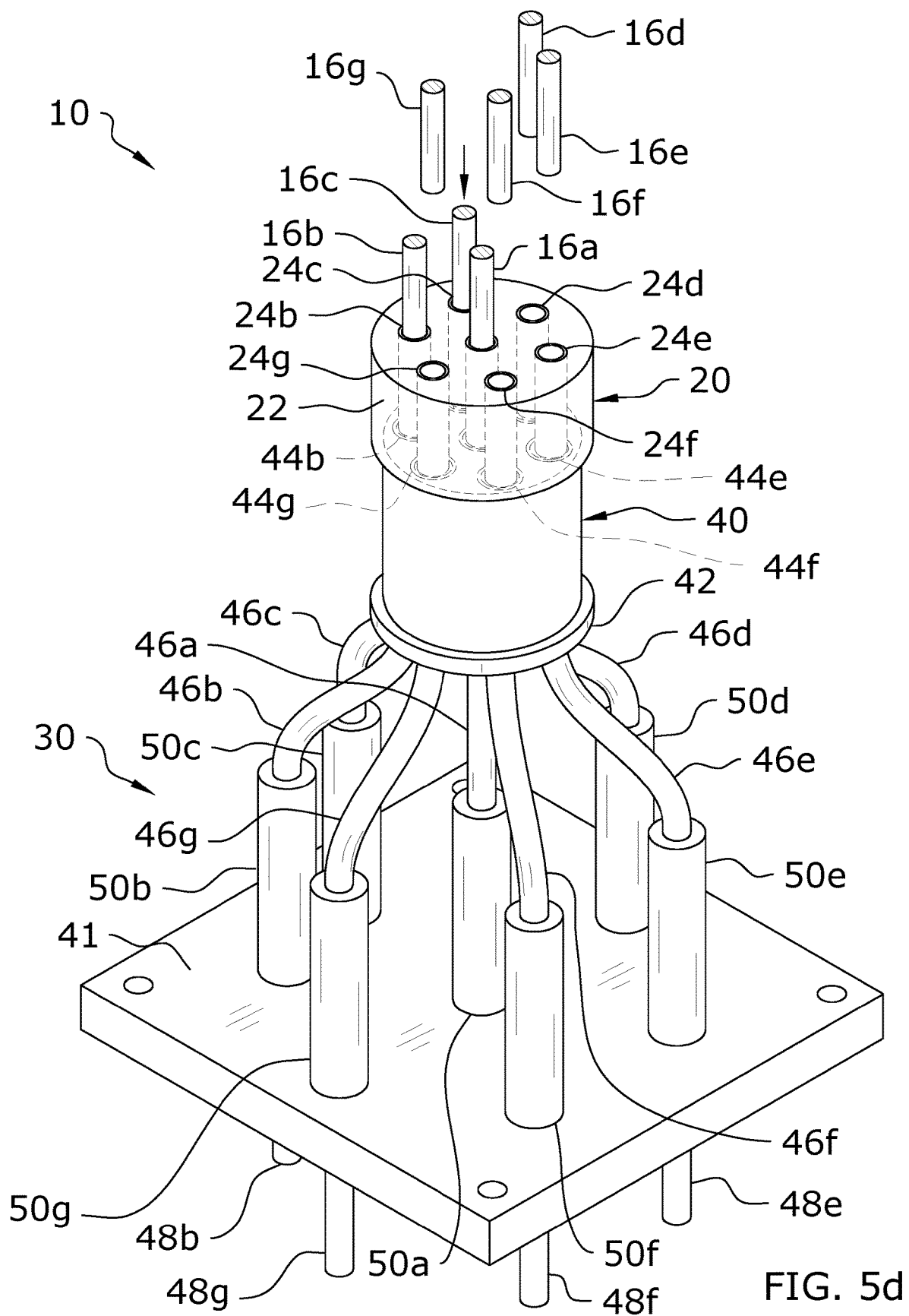
FIG. 5d is an upper perspective view of the electrical connector positioned upon the heat unit with a third wire inserted into a third connector receptacle.
Figure 5E:
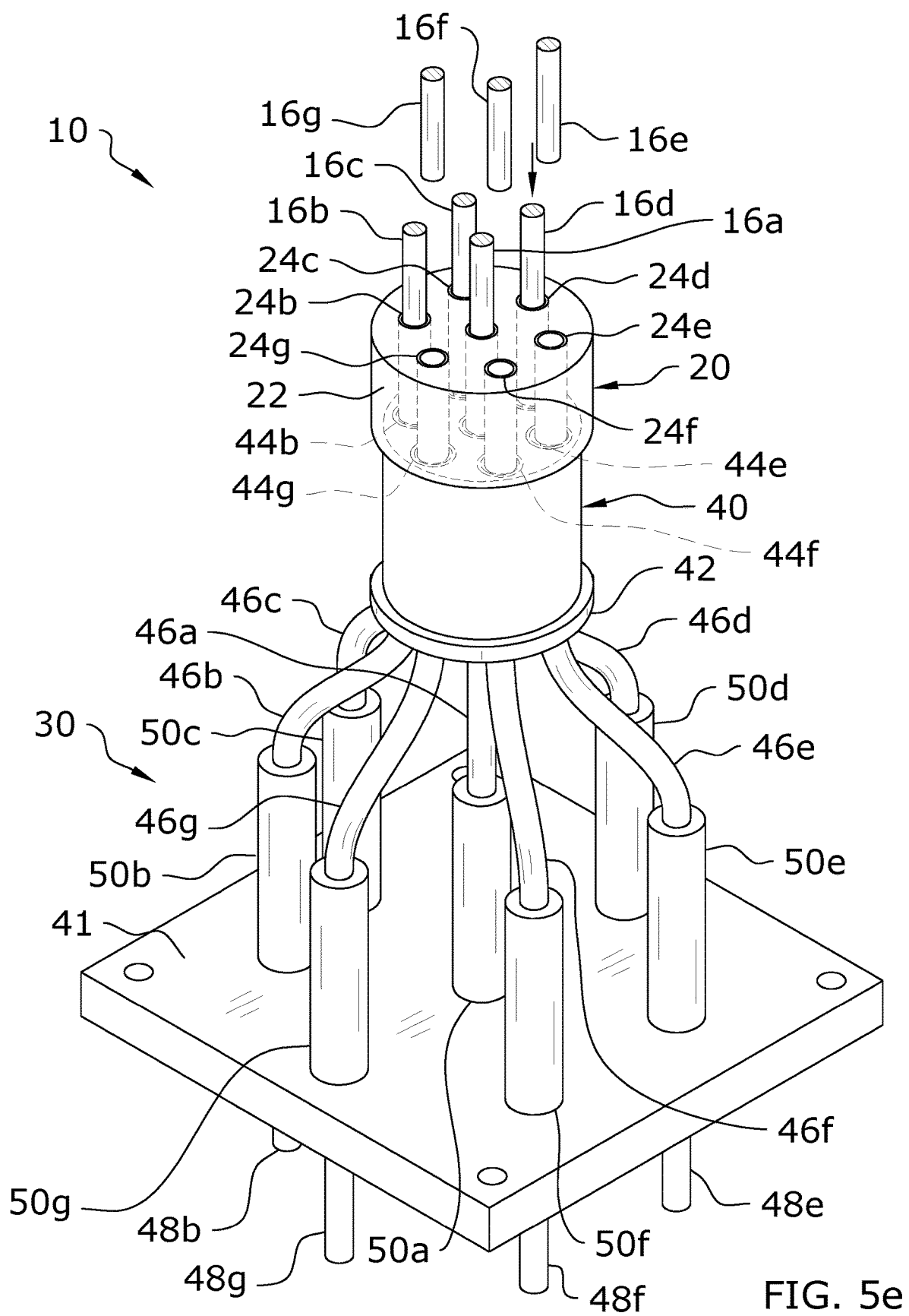
FIG. 5e is an upper perspective view of the electrical connector positioned upon the heat unit with a fourth wire inserted into a fourth connector receptacle.
Figure 5F:
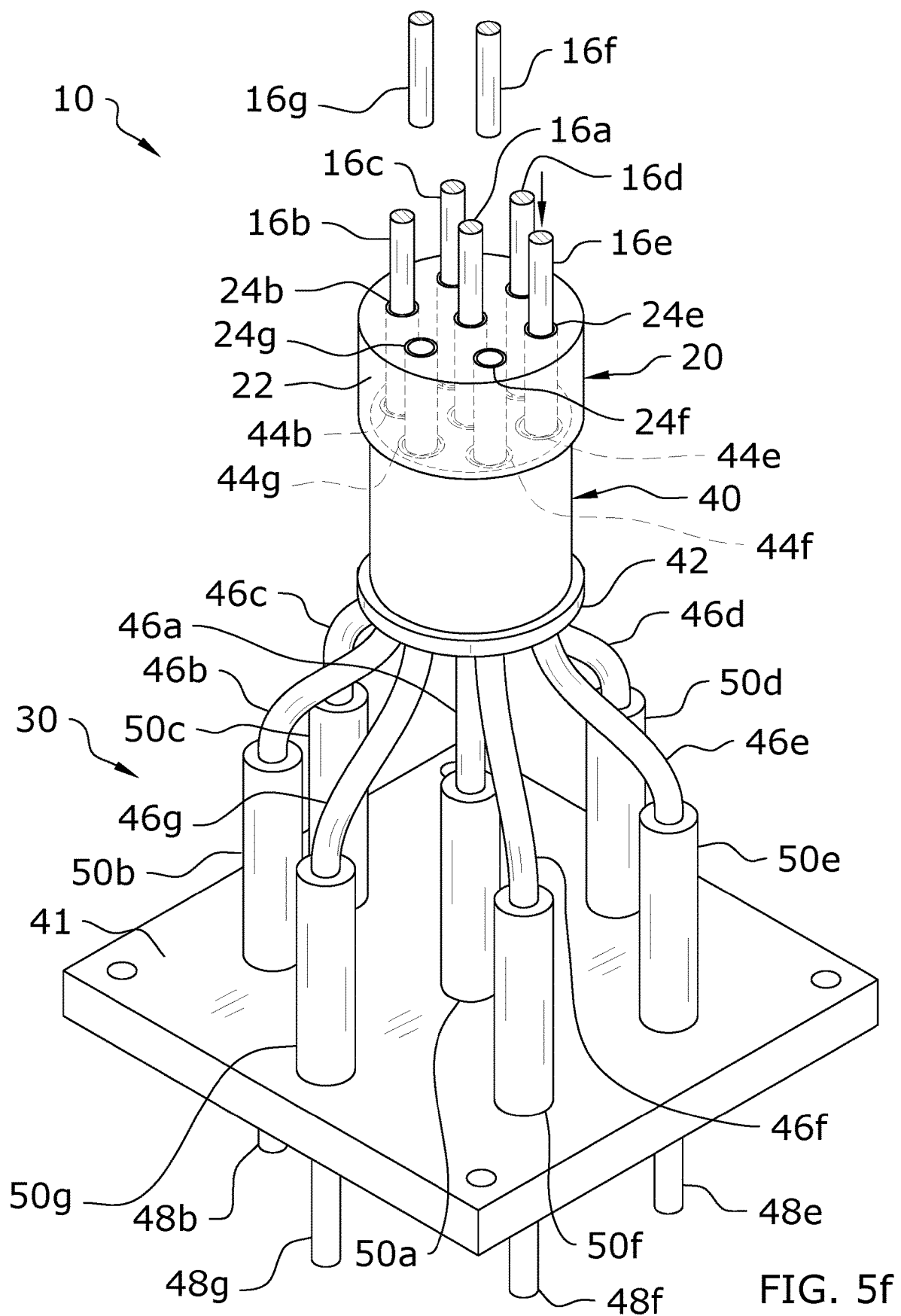
FIG. 5f is an upper perspective view of the electrical connector positioned upon the heat unit with a fifth wire inserted into a fifth connector receptacle.
Figure 5G:
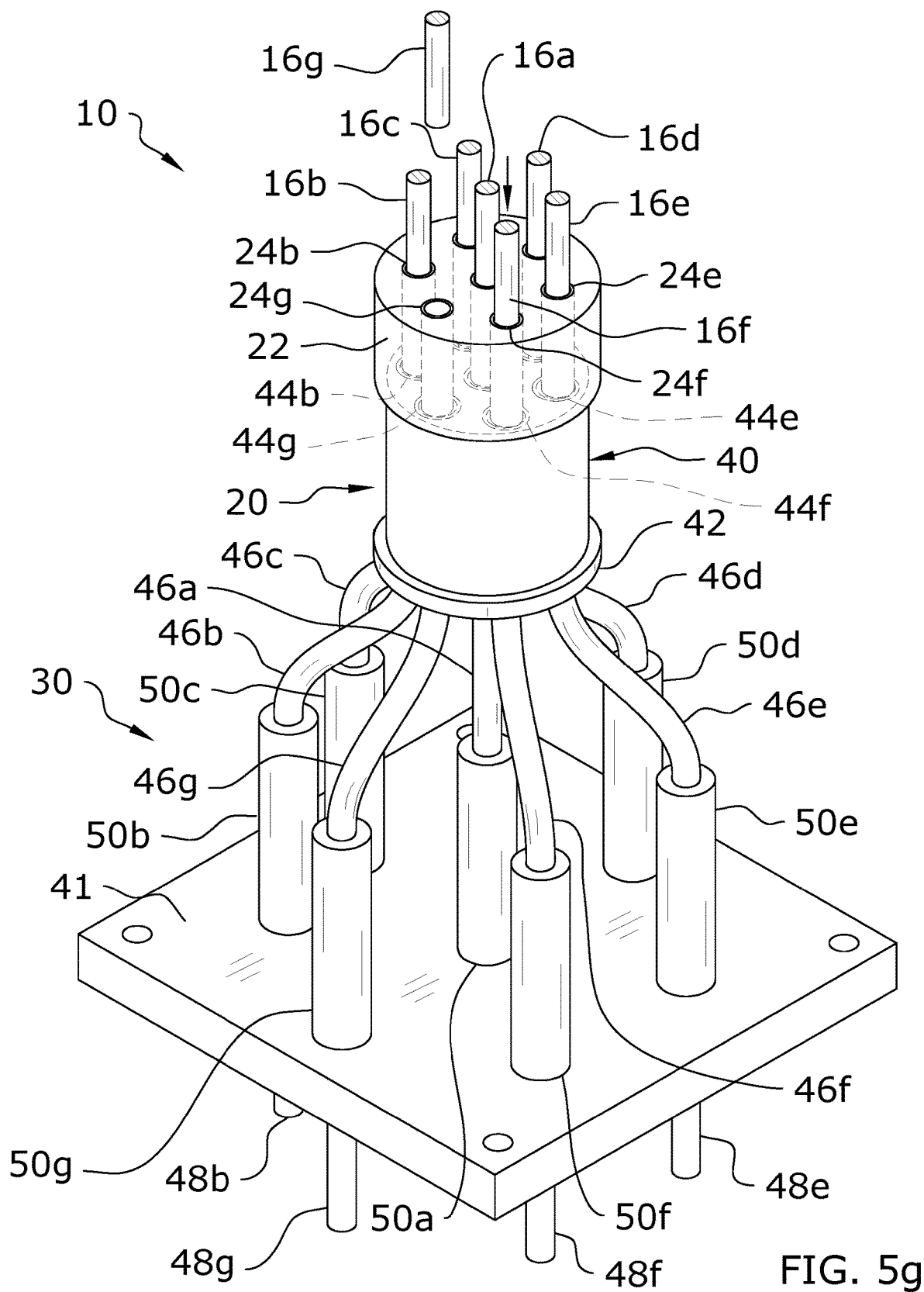
FIG. 5g is an upper perspective view of the electrical connector positioned upon the heat unit with a sixth wire inserted into a sixth connector receptacle.
Figure 5H:
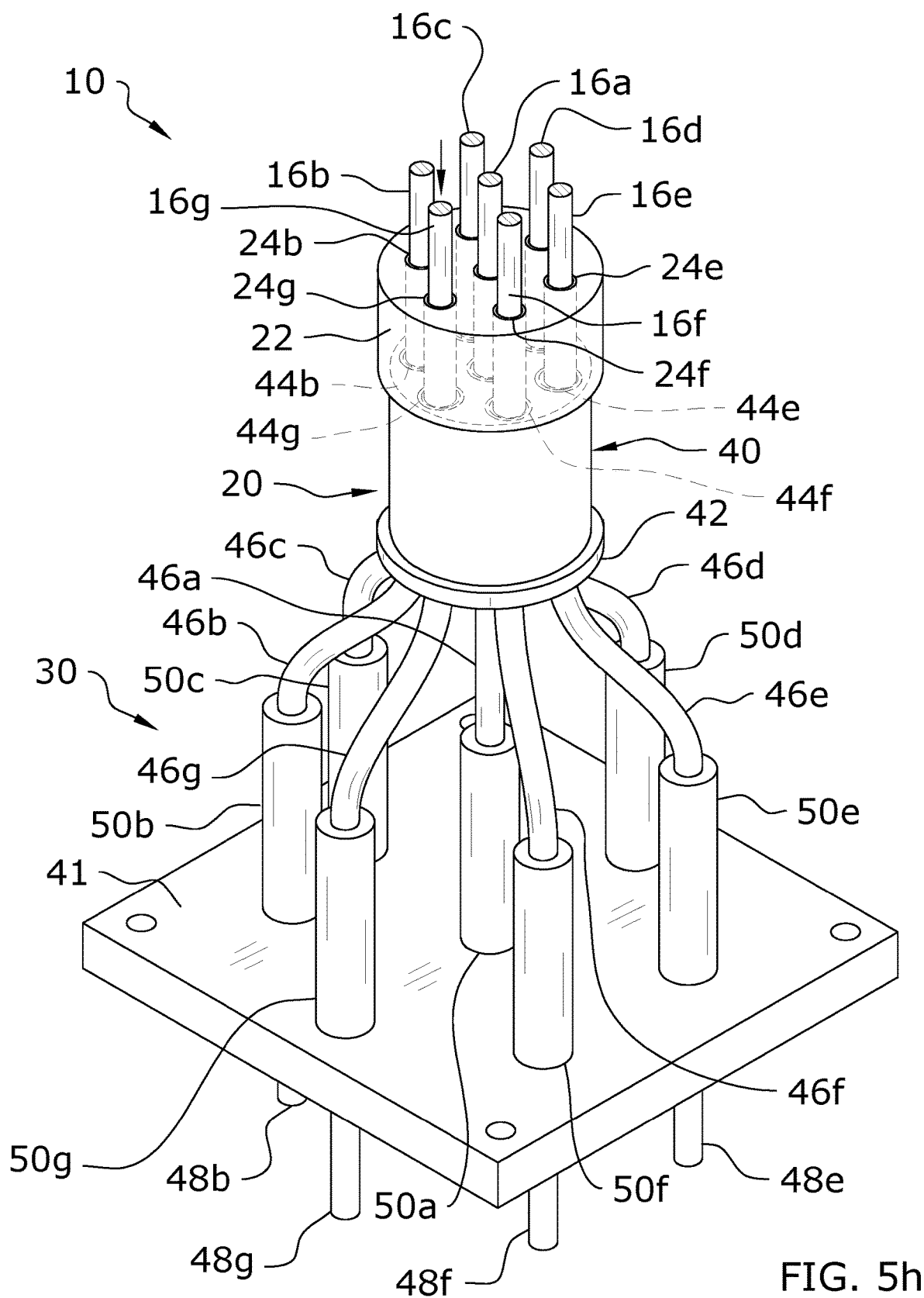
FIG. 5h is an upper perspective view of the electrical connector positioned upon the heat unit with a seventh wire inserted into a seventh connector receptacle.
Figure 6:
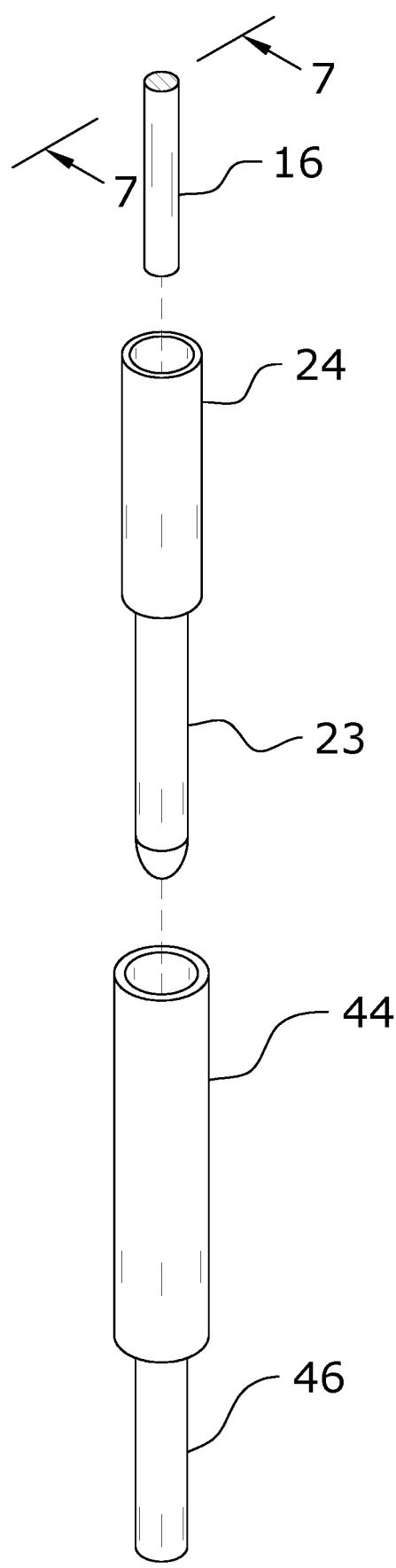
FIG. 6 is an exploded upper perspective view of a wire with respect to a connector pin and a heat receptacle.
Figure 7:
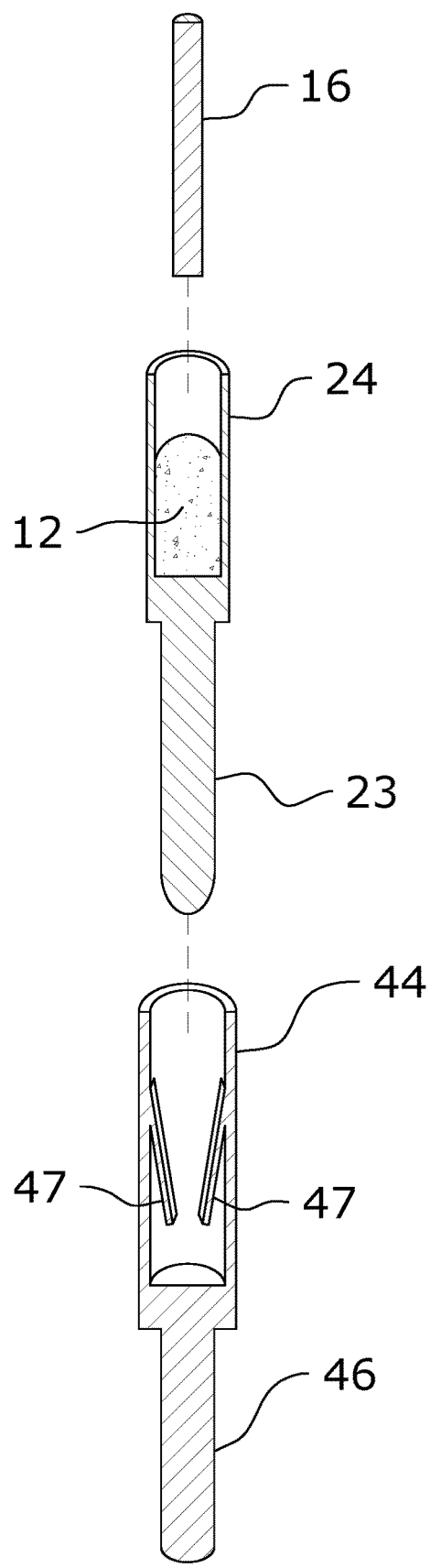
FIG. 7 is an exploded upper perspective cutaway view of FIG. 6 showing the solder within the connector receptacle of the connector pin.
Figure 8A:
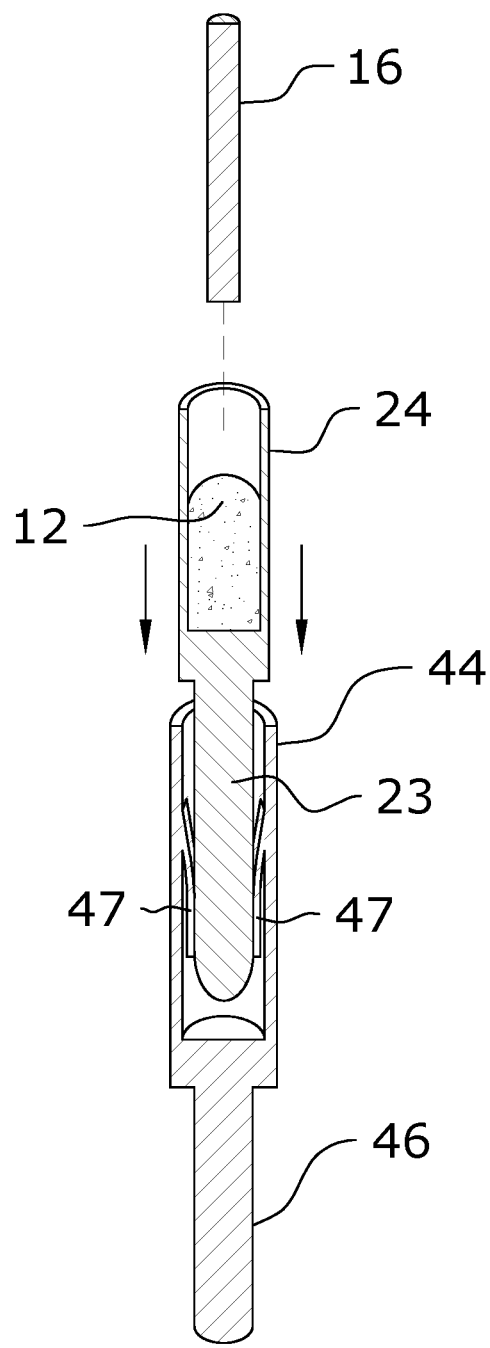
FIG. 8a is an upper perspective cutaway view of the connector pin positioned within the heat receptacle to melt the solder.
Figure 8B:
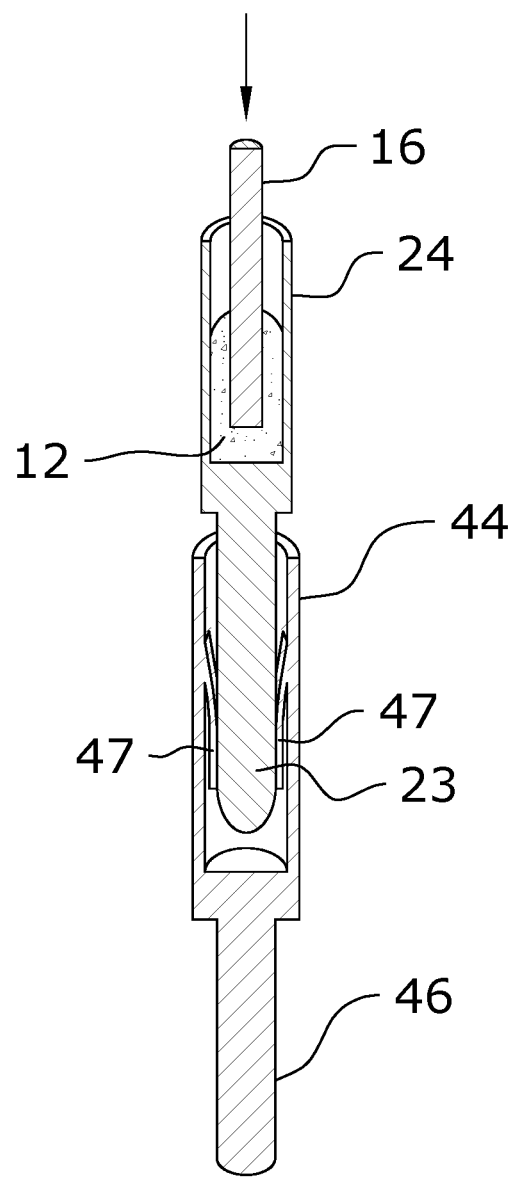
FIG. 8b is an upper perspective cutaway view of the wire inserted into the connector receptacle and the melted solder.
Figure 8C:
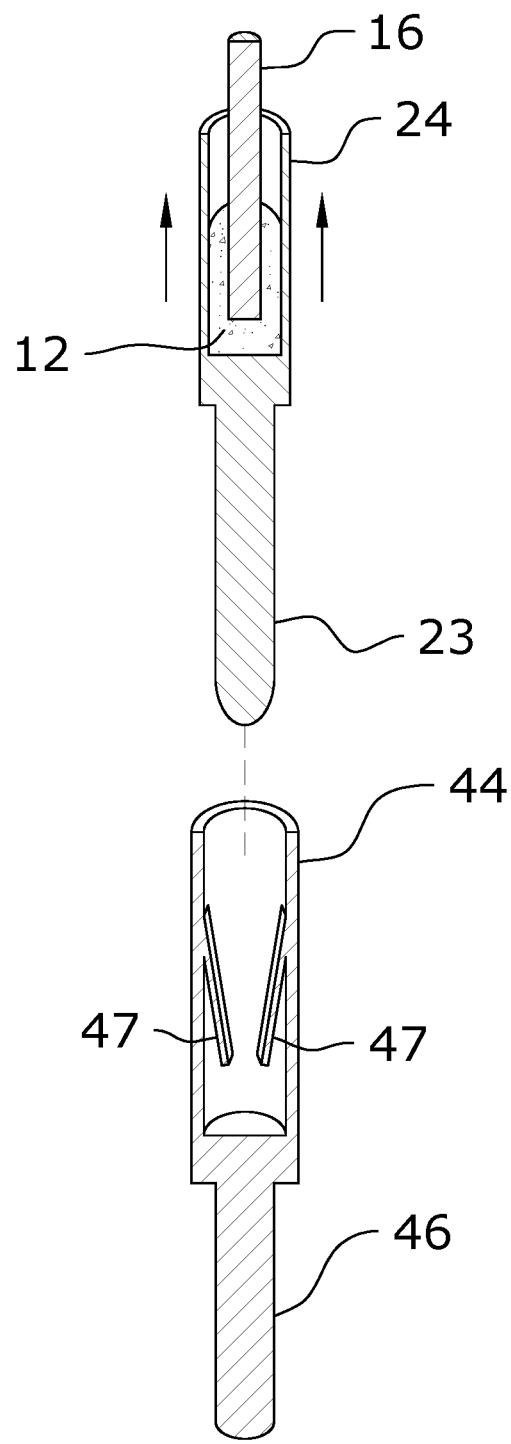
FIG. 8c is an upper perspective cutaway view of the wire connected within the connector pin and the connector pin removed from the heat receptacle.

Heat is first applied to the first connector pin 23a of the plurality of connector pins 23a-g by the heat applicator device 30 thereby melting a first solder 12 within a first connector receptacle 24a of the first connector pin 23a. The technician then inserts a first wire 16a of the plurality of wires 16a-g into the first connector receptacle 24a and the melted solder 12 as illustrated in FIG. 5b of the drawings. The heat is removed from the first connector pin 23a thereby allowing the first solder 12 to harden thereby physically securing and electrically coupling the first wire 16a within the first connector receptacle 24a. Heat is then applied to the second connector pin 23b of the plurality of connector pins 23a-g by the heat applicator device 30 thereby melting a second solder 12 within a second connector receptacle 24b of the second connector pin 23b. The technician then inserts a second wire 16b of the plurality of wires 16a-g into the second connector receptacle 24b and the melted solder 12 as illustrated in FIG. 5c of the drawings. The heat is removed from the second connector pin 23b thereby allowing the second solder 12 to harden thereby physically securing and electrically coupling the second wire 16b within the second connector receptacle 24b. The above process of heating a connector pin and inserting a corresponding wire is repeated until all of the wires 16a-g are soldered to their respective connector receptacles 24a-g as illustrated in FIGS. 5c through 5h and 17 of the drawings. The heat applicator device 30 is not moved relative to the electrical connector 20 during or between the application of heat to the first connector pin or subsequent connector pins 23a-g.

To further illustrate the operation of the present invention as shown in FIG. 1a of the drawings, the technician moves the control switch 34 to position 1 after positioning the electrical connector 20 within the heating unit 40. When the control switch 34 is in position 1, the first heating element 48a is activated thereby heating the first thermal connector 50a which thereby heats the first heat conductor 46a which thereby heats the first heat receptacle 44a which thereby heats the first connector pin 23a. When the first connector pin 23a is heated, the heat is conducted through the length of the first connector pin 23a upwardly to the first connector receptacle 24a thereby melting the first solder 12 within the first connector receptacle 24a. The first wire 16a is inserted into the first connector receptacle 24a and the liquefied first solder 12 within by the technician.

After the first wire 16a is properly inserted, the technician then turns the control switch 34 to position 2 which then deactivates the first heat element 48a thereby allowing the first solder 12 to cool and harden to retain the first wire 16a within the first connector receptacle 24a. Also, when the control switch 34 is in position 2, the second heat element 48b is activated so the same process may be applied for connecting the second wire 16b within the second connector receptacle 24b. When the control switch 34 is in position 2, the second heating element 48b is activated thereby heating the second thermal connector 50b which thereby heats the second heat conductor 46b which thereby heats the second heat receptacle 44b which thereby heats the second connector pin 23b. When the second connector pin 23b is heated, the heat is conducted through the length of the second connector pin 23b upwardly to the second connector receptacle 24b thereby melting the second solder 12 within the second connector receptacle 24b. The second wire 16b is inserted into the second connector receptacle 24b and the liquefied second solder 12 within by the technician.

This process continues with position 3 for the third wire 16c, the fourth wire 16d, the fifth wire 16e, the sixth wire 16f and the seventh wire 16g until all of the wires 16a-g are properly terminated within the electrical connector 20. After the wires 16a-g are properly terminated within the electrical connector 20, the electrical connector 20 is removed from the heating unit 40 of the heat applicator device 30 and then tested to ensure that the wires 16a-g are connected according to the proper pinout.

It is preferable that heat is applied to the connector pins 23a-g to the portion (the male connecting portion) of the connector pins 23a-g extending outwardly from the first side of the electrical connector 20 opposite of the connector receptacles 24a-g and wherein heat is not applied directly to the connector receptacles 24a-g by the heat applicator device 30 (i.e. the heat is conducted from the male connecting portion of the connector pins 23a-g upwardly through to the connector receptacles 24a-g). In addition, it is preferable that the control unit 60 notifies the technician that a specific wire is ready to be inserted into a corresponding connector receptacle after a period of time or other condition is sensed (e.g. temperature of the heating element or heat receptacle). It is further preferable that notification of the technician includes visually indicating on the display unit 62 where the selected connector pin is located on the electrical connector 20 for the wire to be inserted into. It is further preferable that all of the steps of soldering the wires 16a-g to the electrical connector 20 occur without utilizing a soldering hand tool (e.g. a soldering gun or soldering iron).

G. Robotic Wire Termination System

FIGS. 19 through 32 illustrate a robotic heater that moves a heating device 136 selectively to heat one or more connector pins 23n of the electrical connector 20. The robotic heater may be comprised of various types of robot manipulators capable of moving the heating device 136 with respect to a selected single selected connector pin 23n within the electrical connector 20 that is selected to be heated. The control unit 60 is programmed to control the robotic heater to apply heat to the selected connector pin 23n. The robotic heater includes at least one arm that moves the heating device 136 to a desired location near or in contact with the selected connector pin 23n to be heated.

The robotic heater preferably applies heat directly to the connector pins 23n of the electrical connector 20, however, the robotic heater may apply heat indirectly to the connector pins 23n. For example, the electrical connector 20 may be positioned within a heating unit 40 having a plurality of heat receptacles 44 that receive the plurality of connector pins 23n wherein the heat receptacles 44 are thermally coupled to a plurality of heat conductors 46 similar to the heating unit 40 illustrated in FIG. 3a. The robotic heater can apply heat to the connector pins 23n and the corresponding connector receptacles 24n to melt solder 12 within the receptacles 24 by applying the heat to a selected heat conductor 46 extending from the heating unit 40. It is preferable that the robotic heater apply heat directly to the connector pins 23 to efficiently heat the connector pins 23.

The robotic wire termination system includes a frame and a connector support 86 attached to the frame. The frame includes a base 80 and an intermediate support 82 attached to the base 80 having a central opening as illustrated in FIGS. 19, 26 through 28 of the drawings. The central opening is large enough to allow for movement of a portion of the robotic heater including the heating device 136 in both vertical and horizontal manners. An upper support 84 is attached to the intermediate support 82 to removably support the electrical connector 20 during soldering of the wires 16n within the corresponding receptacles 24n of the electrical connector 20.

Figure 19:
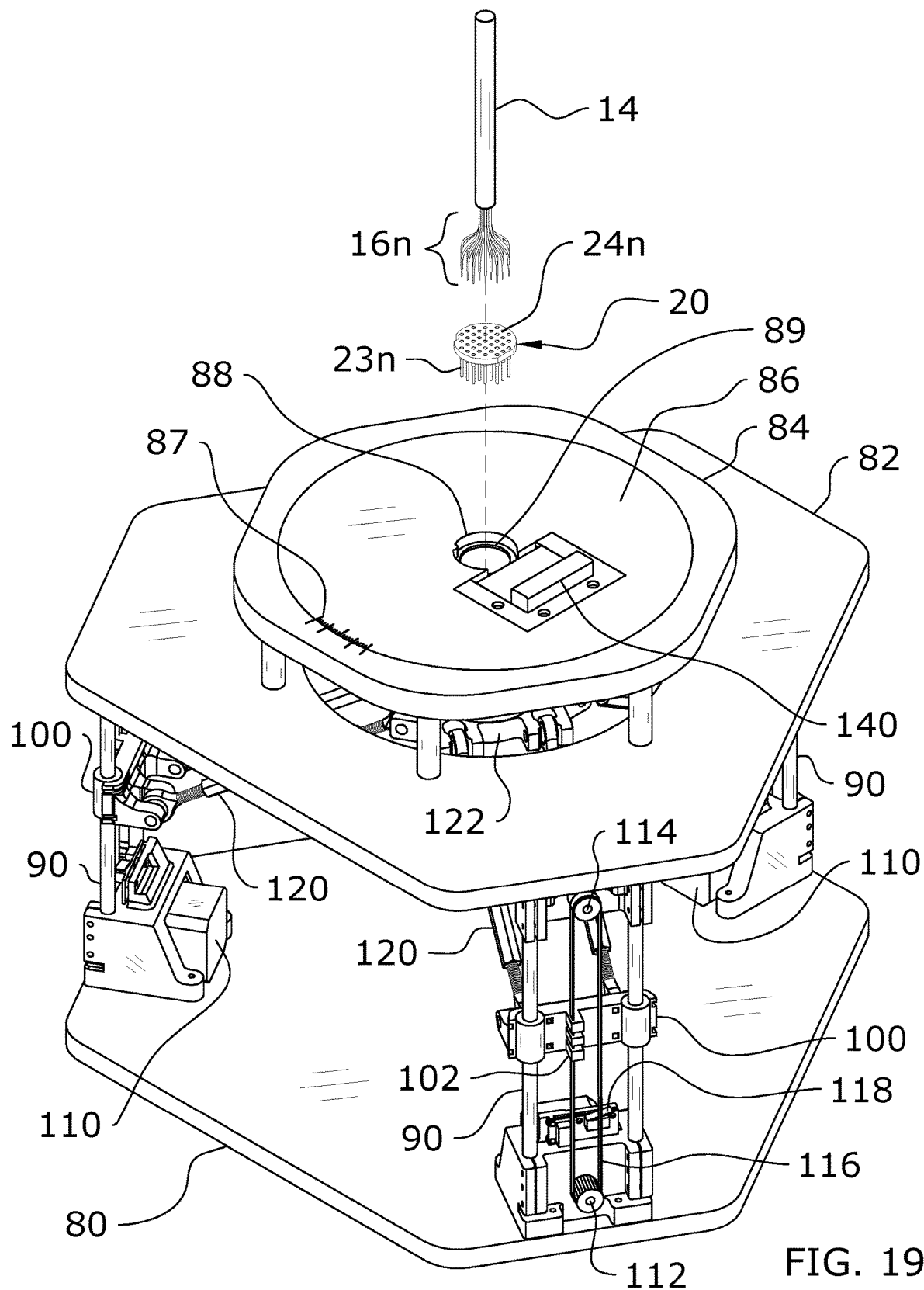
FIG. 19 is an upper perspective view of a second embodiment of the present invention with the electrical connector and the wires in exploded view.
Figure 25A:
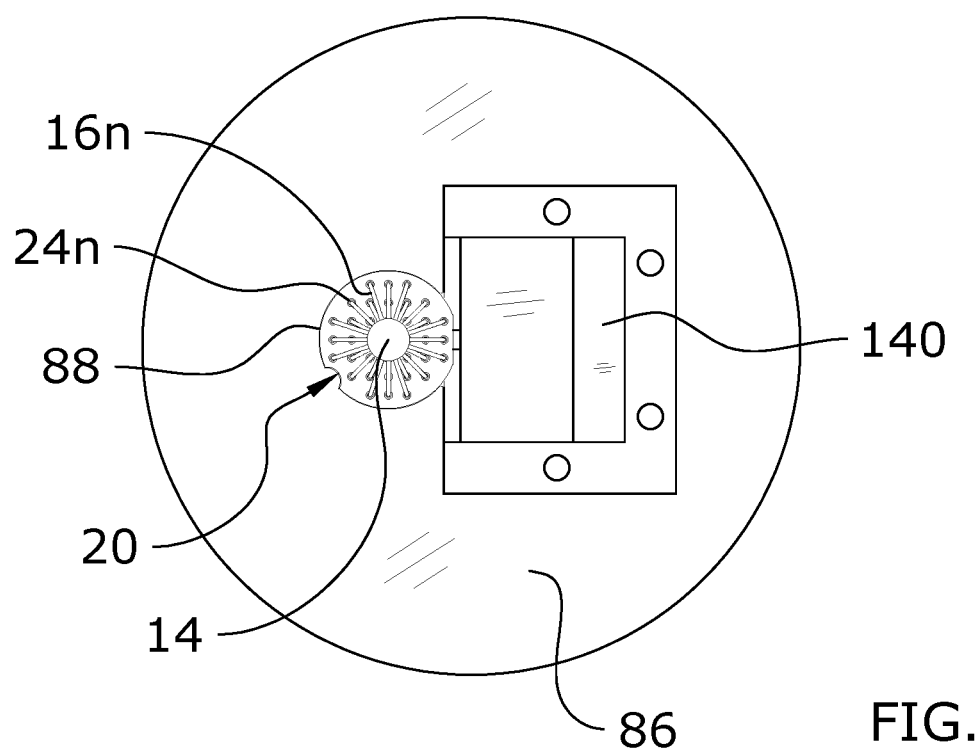
FIG. 25a is a top view of the alignment plate showing the retention member moved outwardly away from the electrical connector to release or insert the electrical connector into the receiver opening in the alignment plate.
Figure 25B:
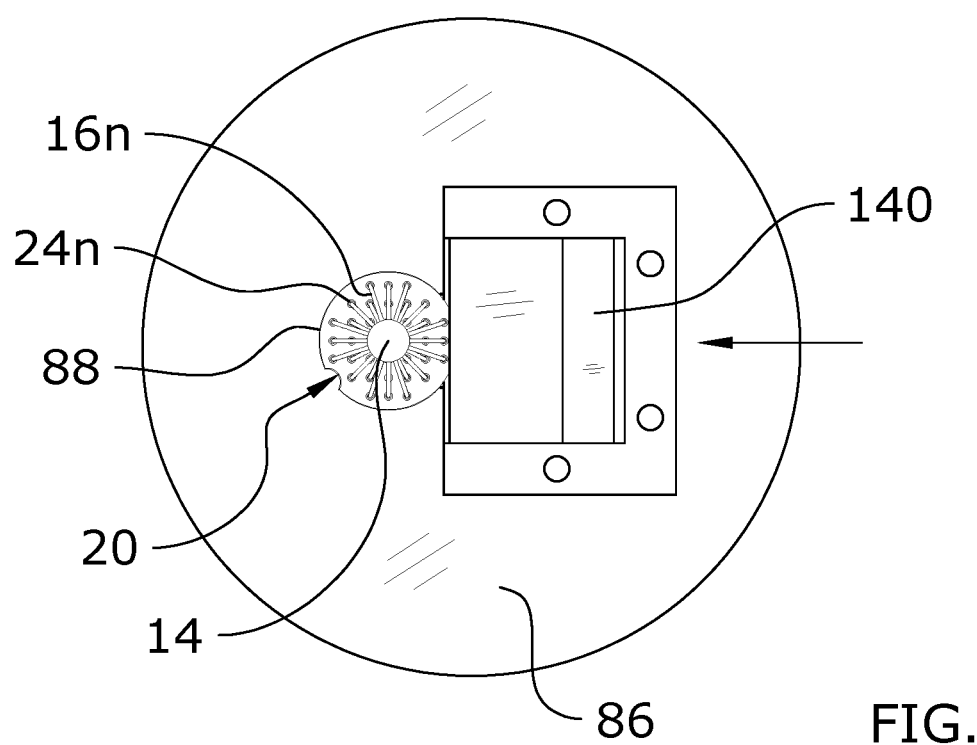
FIG. 25b is a top view of the alignment plate showing the retention member moved inwardly toward the electrical connector to secure the electrical connector within the receiver opening.
Figure 26:
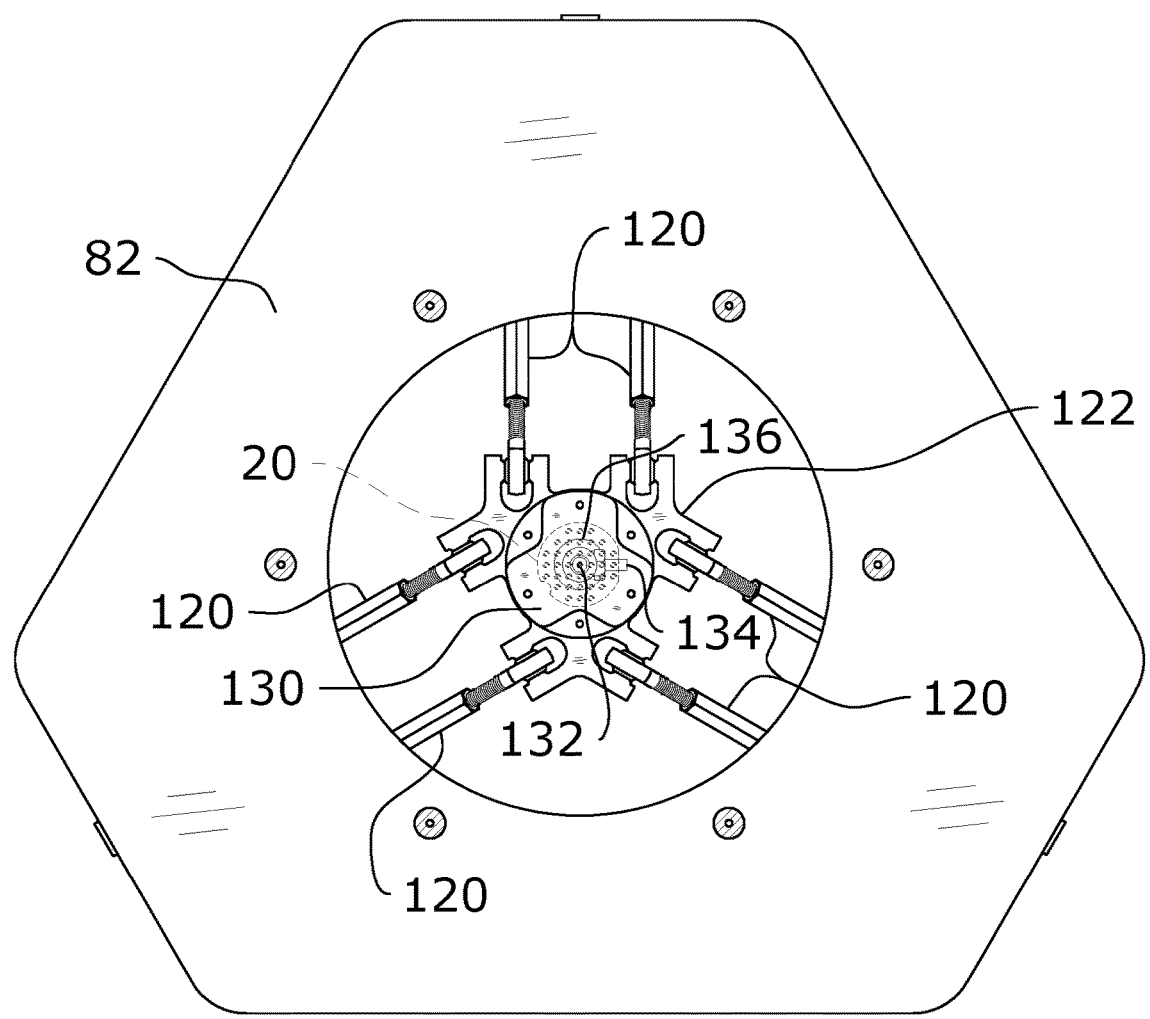
FIG. 26 is a top cutaway view of the second embodiment.

The connector support 86 is adapted to receive and support an electrical connector 20 having a plurality of connector pins 23 and a plurality of connector receptacles 24. As illustrated in FIG. 19, the connector support 86 includes a receiver opening 88 having a shape and size corresponding to the electrical connector 20 thereby removably receiving the electrical connector 20. A key portion may extend inwardly into the receiver opening 88 that corresponds to a cutout within the edge of the electrical connector 20 as illustrated in FIGS. 25a and 25b of the drawings.

As shown in FIGS. 19, 20, 24 through 25b, the connector support 86 further includes a retention member 140 attached to the connector support 86 adapted to selectively engage the electrical connector 20 to prevent removal of the electrical connector 20 from the receiver opening 88 during the heating of the selected connector pins 23n. The retention member 140 selectively engages an outer edge of the electrical connector 20 in a frictional manner thereby allowing the electrical connector 20 to be released from the receiver opening 88 if an accidental significant force is applied to the electrical connector 20 by the robotic heater during operation thereof. The retention member 140 has an engaging edge having a shape corresponding to a portion of the edge of the electrical connector 20 to be engaged. The retention member 140 is also preferably spring biased towards the electrical connector 20 by a spring (e.g. compression spring) thereby maintaining a constant force upon the electrical connector 20 during the entire process to ensure the electrical connector 20 is not accidentally discharged from the receiver opening 88. The retention member 140 preferably includes a handle portion extending upwardly for a user to manually engage with their fingers to pull the retention member 140 away from the electrical connector 20 thereby allowing the electrical connector 20 be removed and also allowing for the insertion of a new electrical connector 20 to have the wires 16n soldered to.

Figure 24:
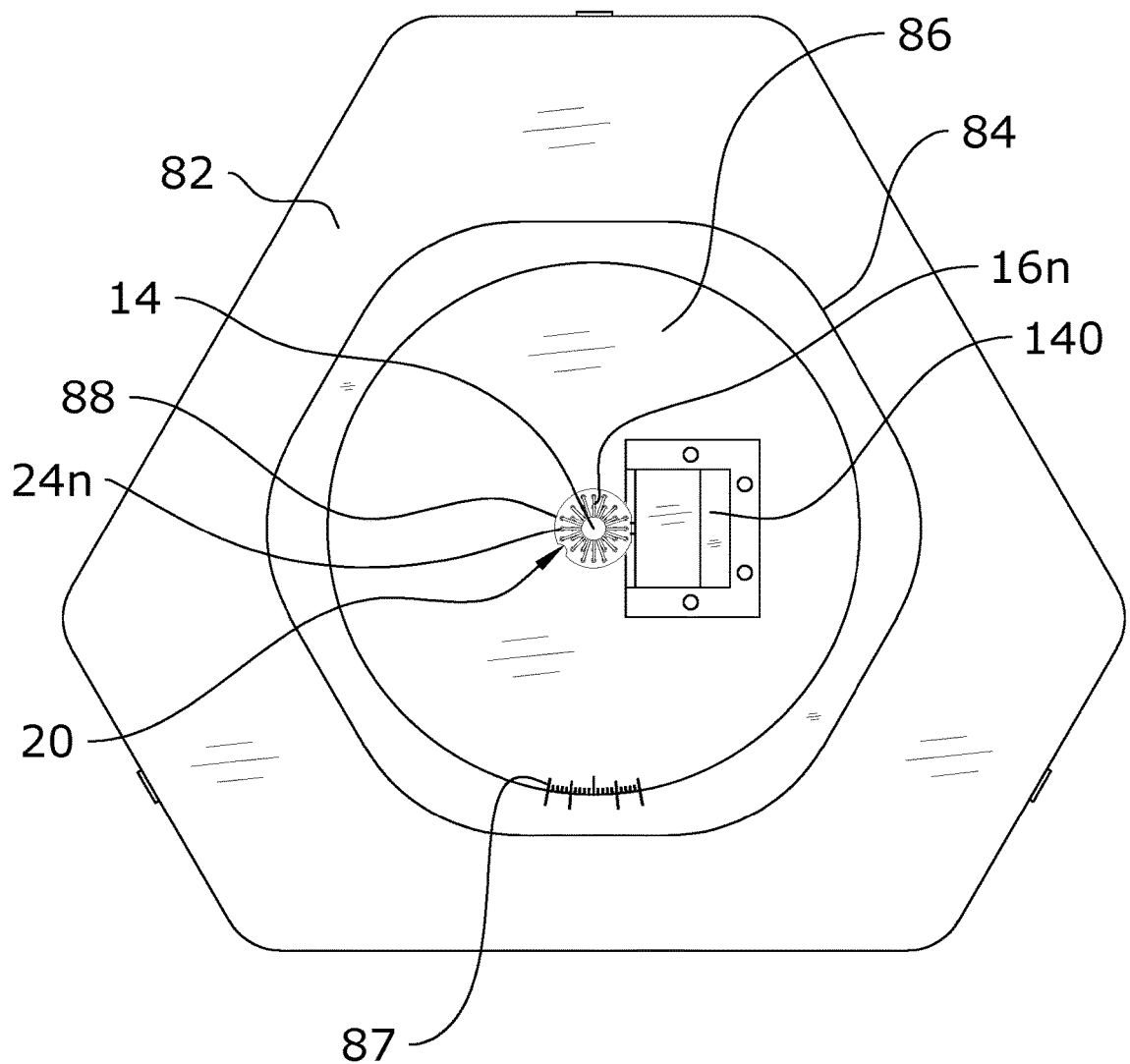
FIG. 24 is a top view of the present invention with the wires inserted into the electrical connector.

The connector support 86 may be non-movably or movably positioned within the upper support 84. The connector support 86 is preferably rotatably positioned within the upper support 84 to allow for adjustment of the position of the connector pins 23 with respect to the robotic heater. Angle markings 87 are imprinted upon the surface of the upper support 84 and the connector support 86 to indicate the angular movement of the connector support 86 with respect to the upper support 84. as best illustrated in FIG. 24 of the drawings.

The robotic heater includes a robot manipulator to manipulate the position (horizontal position, vertical position and/or attitude) of the heating device 136 to selectively heat individual connector pins 23n of the electrical connector 20. The robot manipulator includes at least one arm that the heating device 136 is attached to. Utilizing a robotic heater has many advantages over the static system illustrated in FIGS. 1 through 18 in that various types of electrical connectors 20 may have the wires 16n connected without a physical change in the configuration of the robotic heater because the robotic heater may be programmed to apply heat to various types of electrical connectors 20 in various patterns, temperatures, timing and manners.

The robot manipulator is preferably comprised of a programmable robot which is programmed to selectively apply heat to each of the connector pins 23n in a preselected pattern thereby allowing the worker to insert the corresponding wire 16n into the currently heated connector receptacle 24n similar to the process discussed above except where the robot manipulator moves the heating device 136 to the individual connector pin 23n to be heated.

The robot manipulator may be comprised of various types of robots and robotic arms capable of moving the heating device 136 in a position required to heat a selected individual connector pin 23n. Examples of preferred robots suitable for usage within the present invention include an articulated robot 152 (FIG. 32), a parallel robot (FIGS. 19 through 23, 30), a Cartesian coordinate robot (a.k.a. linear robot). One example of a preferred parallel robot for the robot manipulator is a delta robot as illustrated in FIGS. 19 through 23, 30.

Figure 22:
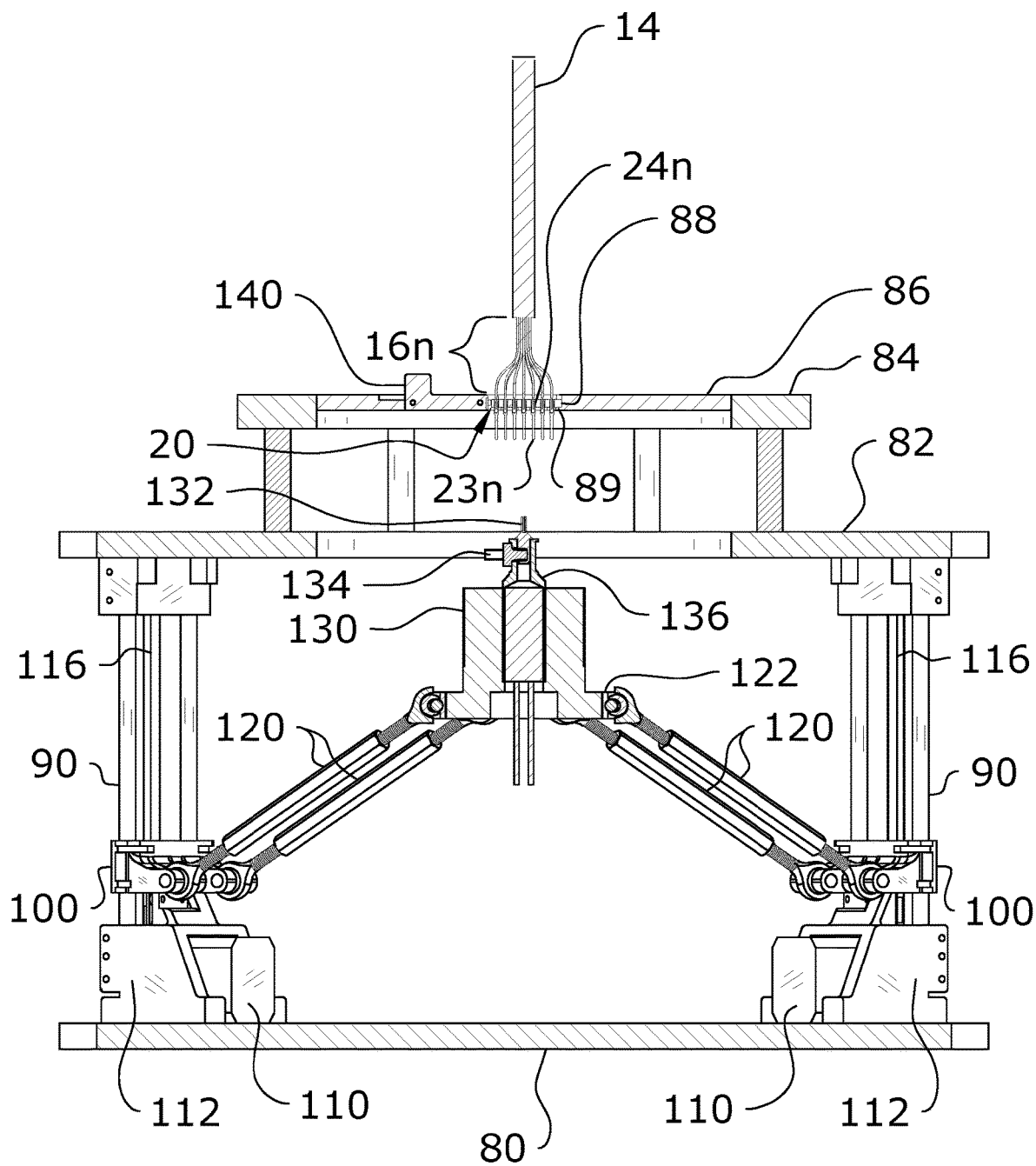
FIG. 22 is a side cutaway view of the second embodiment.
Figure 23:
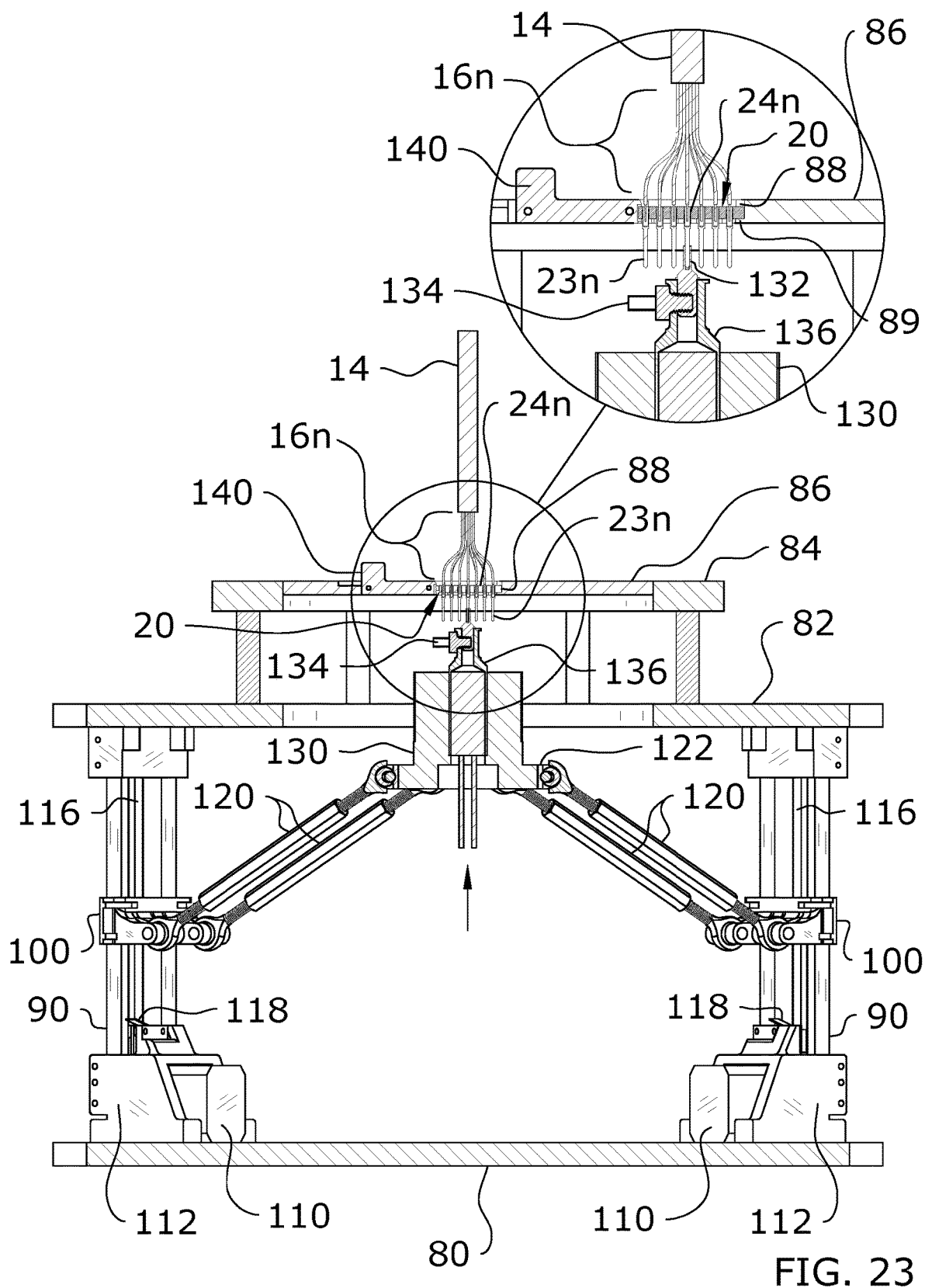
FIG. 23 is a side cutaway view of the second embodiment with the heating element moved upwardly to physically contact one of the connector pins of the electrical connector.
Figure 27:
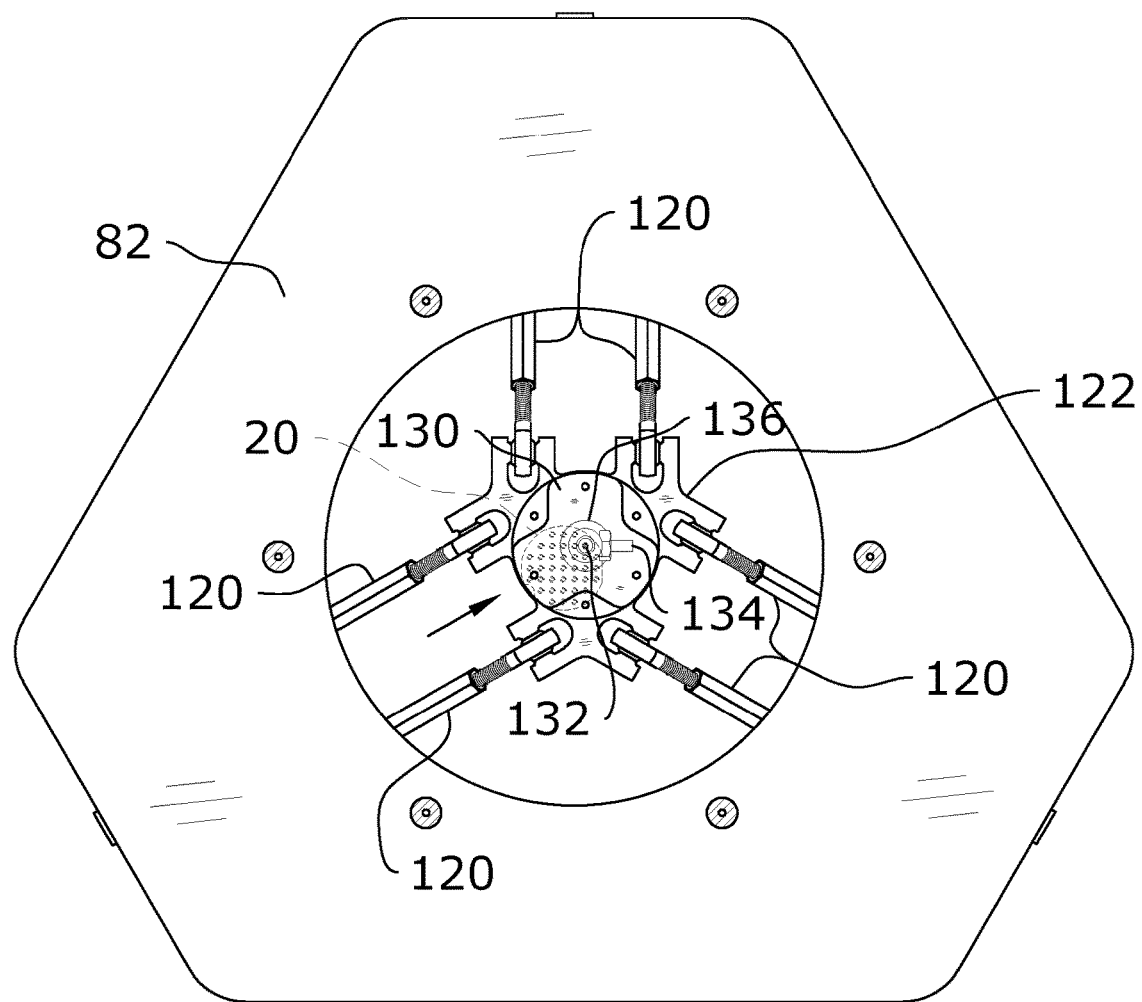
FIG. 27 is a top cutaway view of the second embodiment moving the heating element in a first direction.
Figure 28:
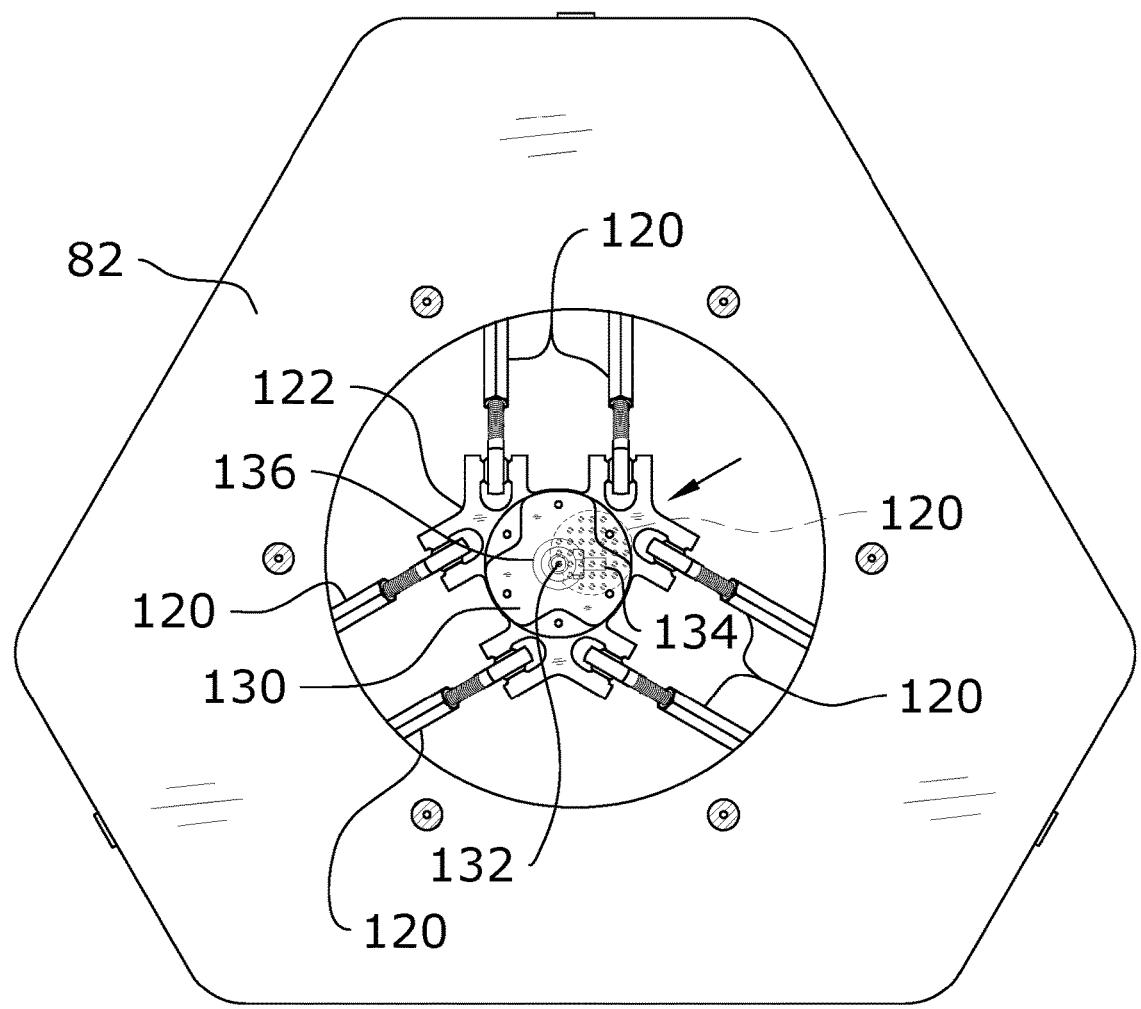
FIG. 28 is a top cutaway view of the second embodiment moving the heating element in a second direction.
Figure 29:
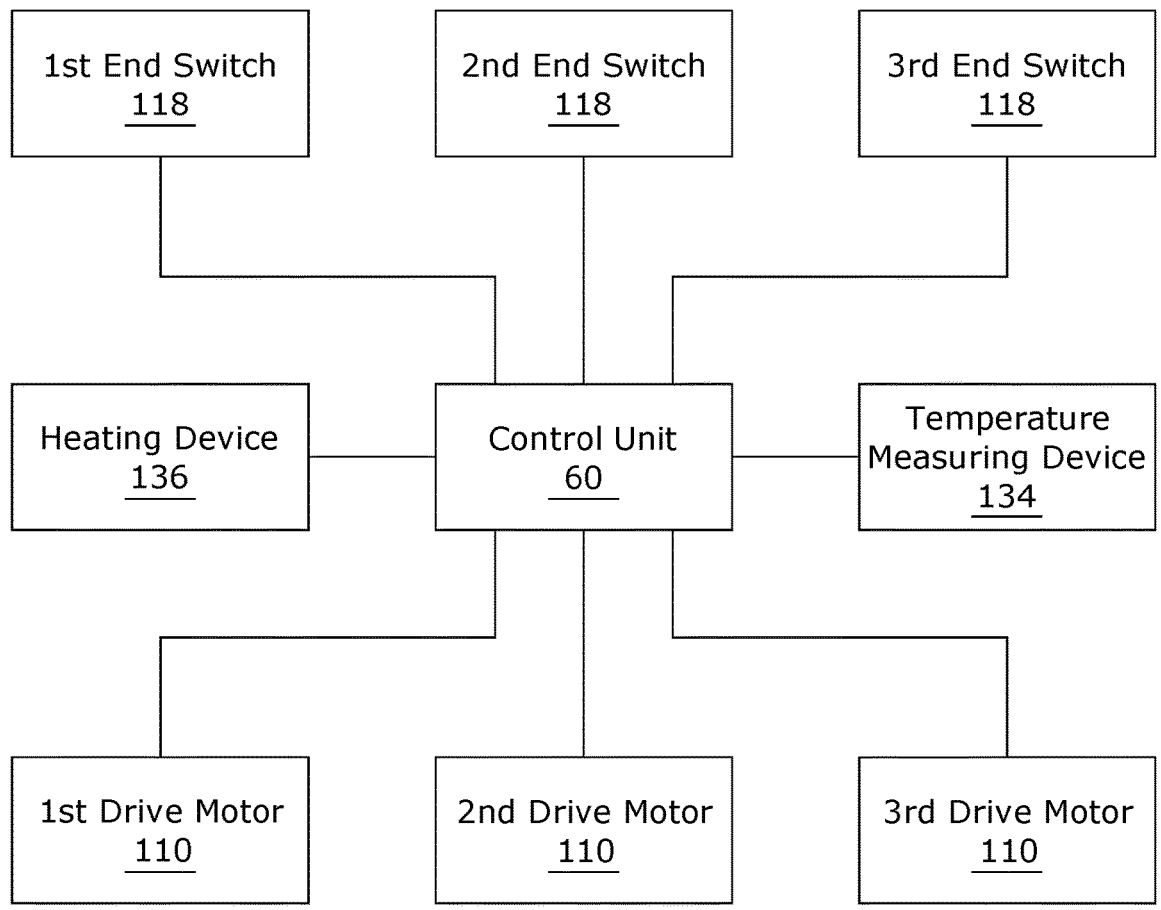
FIG. 29 is a block diagram of the second embodiment illustrating the communications with the control unit and the elements of the second embodiment.

The at least one arm of the robot manipulator is adapted to move the heating device 136 to be aligned (preferably concentrically aligned) with the selected connector pin 23n of the electrical connector 20 for selective heating. The robot manipulator is further adapted to move the heating device 136 transversely with respect to a longitudinal axis of the selected connector pin (i.e. the heating device 136 moves along a plane that is transverse with respect to the longitudinal axis of the selected connector pin) as illustrated in FIGS. 27 and 28 of the drawings. The robot manipulator is further adapted to move the heating device 136 inwardly and outwardly with respect to the selected connector pin as illustrated in FIGS. 22 and 23 of the drawings. For example, when the electrical connector 20 is positioned above the robot manipulator and the heating device 136 as shown in FIGS. 19 through 23, the robot manipulator is capable of moving the heating device 136 upwardly, downwardly, and/or horizontally (e.g. forwardly, rearwardly, left, right) thereby aligning the heating device 136 with the selected connector pin to be heated.

The delta robot preferably includes three control arms 120 (each control arm 120 may have a two or three arms for added stability during operation). The first ends of the three control arms 120 are movably connected to the heating device 136 (or a support member 122 that supports the heating device 136) via corresponding first universal joints. The opposing second ends of the three control arms 120 are movably connected to motorized devices via corresponding second universal joints. The motorized devices may be comprised of any device adapted to move the second ends of the control arms 120 independently upwardly, downwardly and/or horizontally thereby manipulating the position of the heating unit correspondingly.

Figure 20:
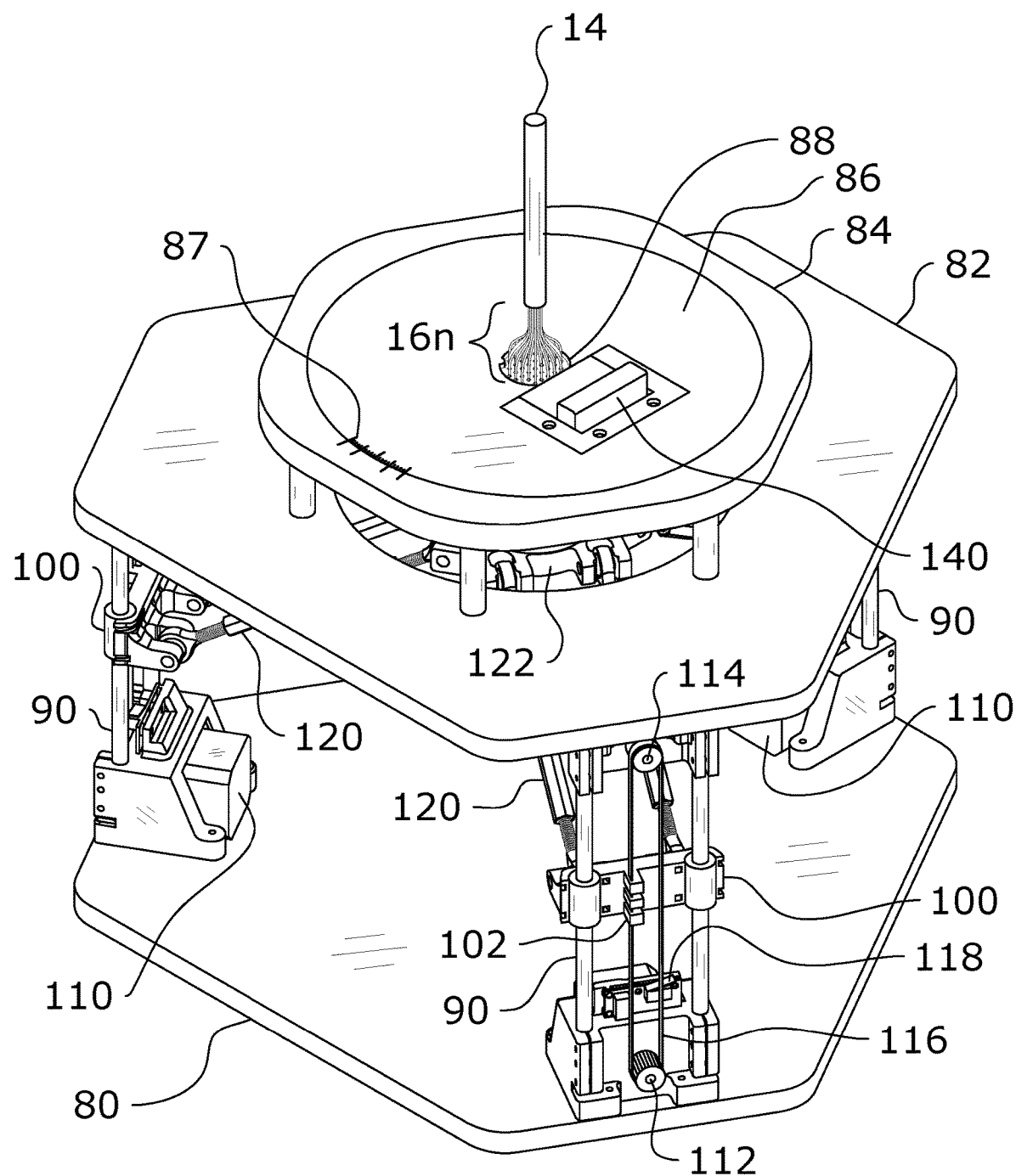
FIG. 20 is an upper perspective view of the second embodiment with the electrical connector seated within the present invention and the wires inserted into the electrical connector.
Figure 21:
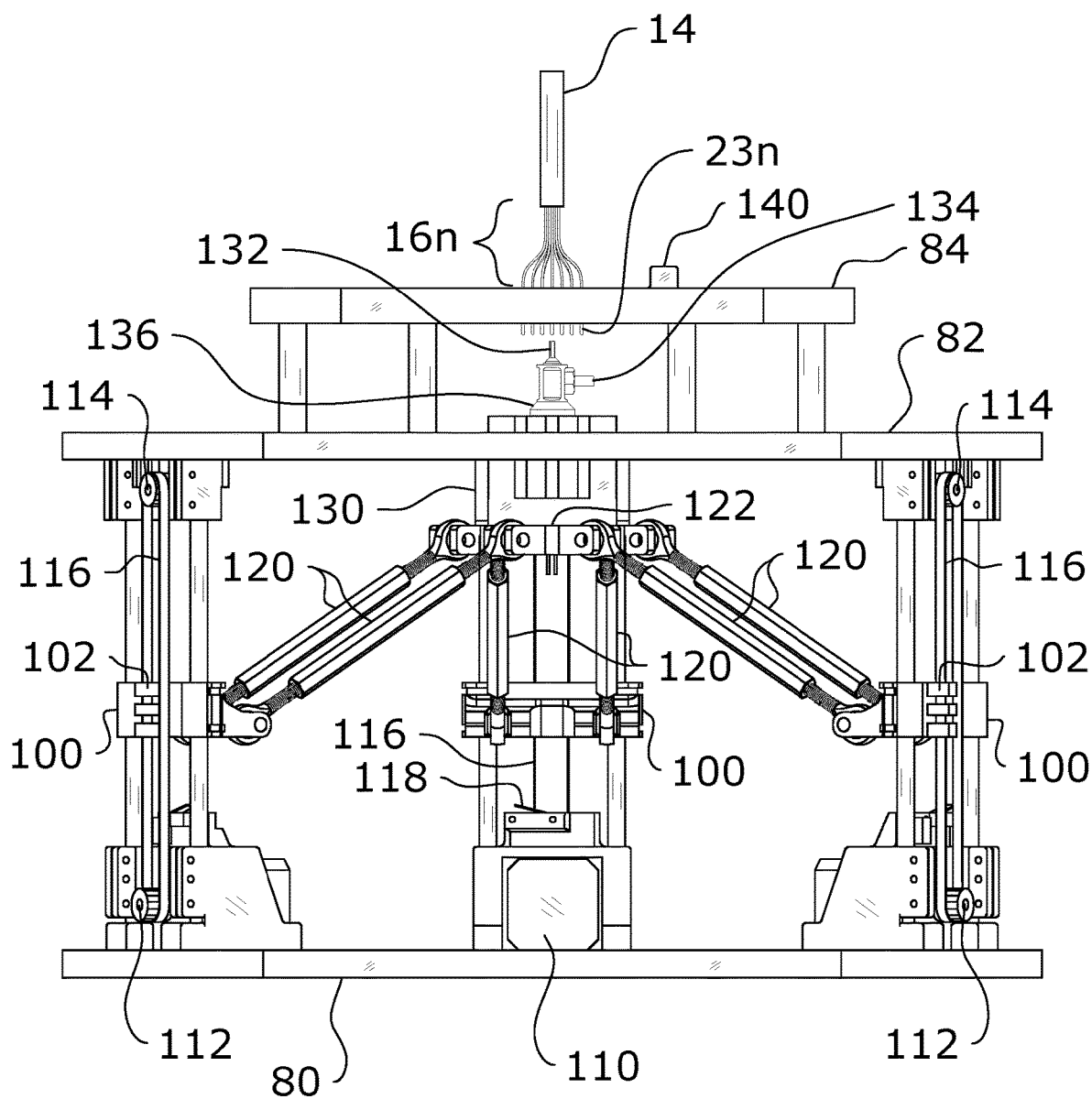
FIG. 21 is a side view of the second embodiment illustrating the robotic heater.

FIGS. 19 through 23 illustrate an exemplary delta robot having motorized devices each comprised of a guide member 90 attached to the frame, a drive motor 110 (e.g. stepper motor), a drive belt 116 connected to the drive motor 110 and an idler pulley 114, and an arm carrier 100 slidably positioned upon the guide member 90. Each of the motorized devices preferably includes an end switch 118 which detects when the arm carrier 100 is positioned at the bottom of the guide members 90. The end switch 118 communicates the detection of the arm carrier to the control unit 60 which makes any adjustments required based on the expected location of the arm carrier 100. It is preferable to have two guide members 90 extending vertically between the base 80 and the intermediate support 82 with each of the guide members 90 comprised of rods. The drive belt 116 has a first run and a second run between the drive motor 110 and the idler pulley 114. The arm carrier 100 includes a belt connector 102 non-movably attached to the first run of the drive belt 116 as illustrated in FIGS. 19 and 20 of the drawings. The drive belt 116 preferably includes teeth and the drive pulley 112 on the drive motor 110 also includes corresponding teeth to prevent slippage and to ensure the location of the heating device 136 is known at all times by the control unit 60 for controlling purposes. The control arms 120 are movably connected to their corresponding arm carrier 100 by universal joints. The upward or downward movement of each arm carrier 100 determines the position of the heating device 136. The control arms 120 are preferably adjustable in length to allow for fine tuning of the robot manipulator by having threaded ends as shown in FIGS. 19 through 23 of the drawings.

FIG. 30 illustrates the usage of three linear actuators 150 for the delta robot. Each of the linear actuators 150 is controlled by the control unit 60 as illustrated in FIG. 31 of the drawings. The linear actuators 150 may be electrically powered or hydraulically powered actuators 150.

The heating device 136 attached to the arm of the robot manipulator as discussed previously. The arm of the robot manipulator is adapted to move the heating device 136 so that the heating device 136 can apply heat to a selected connector pin 23n of the electrical connector 20 as also discussed. The heating device 136 may be comprised of any device capable of producing heat sufficient to be thermally conducted by the connector pins 23n to melt solder 12 in the connector receptacles 24n of the electrical connector 20.

The heating device 136 may be comprised of a technology that requires direct physical contact with the connector pin 23n being heated to transfer heat from the heating device 136 to the selected connector pin. One example of a heating device 136 that requires direct or indirect physical contact to transfer heat is comprised of an electrical heating element that includes a heat transfer portion 132 adapted to removably connect to a single connector pin 23n to be heated. The electrical heating element is housed within an insulator 130 (e.g. ceramic) with the heat transfer portion 132 extending outwardly. As discussed previously herein, there are many types of physical devices capable of physically connecting to the connector pins 23n to transfer heat from the heating device 136 to the connector pins 23n. For example, the heating device 136 includes a heat transfer portion 132 that at least partially surrounds the selected connector pin during heating of the selected connector pin (e.g. a tubular structure). FIGS. 6 through 8c illustrate examples of suitable heat transfer portions 132 that allow for removable physical and thermal connections between the heating device 136 and the connector pins 23n.

The heating device 136 may also be comprised of a heating technology where no physical contact between the heating device 136 and the connector pin 23n during the heating of the selected connector pin 23n is required. An example of a suitable heating device 136 that does not require direct physical contact with the selected connector pin during heating is a laser that directs a laser light towards the selected connector pin to heat the selected connector pin. With no physical contact (direct or indirect) between the heating device 136 and the connector pins 23n, the heating device 136 is preferably concentrically aligned with the corresponding connector pin 23n to be heated in a distally spaced manner as illustrated in FIG. 9 of the drawings.

A temperature measuring device 134 is thermally connected to the heating device 136 to measure a temperature of the heating device 136 to determine the amount of heat being produced by the heating device 136 thereby allowing the control unit 60 to determine when to deactivate the heating unit 40. The temperature measuring device 134 is in communication with the control unit 60 to transmit temperature data to the control unit 60 measured by the temperature measuring device 134. The temperature measuring device 134 may be comprised of any device capable of measuring high temperatures such as, but not limited to, a thermocouple.

The control unit 60 is programmable and in communication with the robot manipulator to control the operation of the robot manipulator. The control unit 60 is further in communication with the temperature measuring device 134 and the heating device 136 to control the application of heat by the heating device 136 during operation. The control unit 60 is programmed to control the position and movement of the arm and the heating device 136 of the robot manipulator to ensure efficient heating of the connector pins 23n. Based on the feedback from the temperature measuring device 134, the control unit 60 determines how much electrical power to be provided to the heating device 136 to achieve the desired temperature output to the heat transfer portion 132 at any particular time.

In operation, the user inserts an electrical connector 20 into the receiver opening 88 and releases the retention member 140 which retains the electrical connector 20 within the receiver opening 88. The electrical connector 20 rests upon a lower lip 89 within the receiver opening 88 as best illustrated in FIG. 23 of the drawings. The connector pins 23n of the electrical connector 20 are exposed through the bottom of the receiver opening 88 wherein the heating device 136 may selective heat individual connector pins 23n. The control unit 60 is programmed for the specific type of electrical connector 20 including the first connector pin 23*n* to heat to the last connector pin 23*n* to heat along with the specific connector pins 23*n* to be heated therebetween and in the desired order.

Once the electrical connector 20 is properly seated in the receiver opening 88, the control unit 60 activates the robot manipulator to manipulate the position of the heating device 136 to heat the first connector pin 23*n* as preprogrammed wherein solder within the corresponding first connector receptacle 24*n* is melted and the user inserts a corresponding first wire 16*n* into the first connector receptacle 24*n*. When the heating device 136 is directly or indirectly heating the connector pin 23*n*, the robot manipulator positions the heat transfer portion 132 of the heating device 136 in physical and thermal contact with the connector pin 23*n* as illustrated in FIG. 23 of the drawings. The control unit 60 deactivates the heating device 136 and then removes the heat transfer portion 132 from contacting the first connector pin 23*n*. The control unit 60 then activates the robot manipulator to position the heat transfer portion 132 to the second connector pin 23*n* to be heated and the above process is repeated for the second connector pin 23*n*. The process continues for the third, fourth, fifth and remaining connector pins 23*n* until all of the wires 16*n* are secured within their respective connector receptacles 24. Once the wires 16*n* are properly attached physically and electrically within the electrical connector 20, the user then moves the retention member 140 to allow release of the electrical connector 20 from the receiver opening 88. The entire process is then repeated with the next electrical connector 20.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the invention will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the present invention, suitable methods and materials are described above. Thus, the present invention is not intended to be limited to the embodiments shown, but is to be accorded the widest scope consistent with the principles and features disclosed herein.

What is claimed is:

1. A robotic wire termination system for soldering a plurality of wires to an electrical connector, comprising:
   a connector support adapted to removably receive and support an electrical connector having a plurality of connector pins and a plurality of connector receptacles;
   a robot manipulator having at least one arm;
   a heating device attached to the at least one arm, wherein the at least one arm is adapted to move the heating device so that the heating device selectively applies heat to a selected connector pin from the plurality of connector pins;

whereby the heat applied to the selected connector pin melts solder to make an electrical connection between a selected wire from a plurality of wires and the selected connector pin; and a control unit in communication with the robot manipulator, wherein the control unit is programmed to control a position and movement of the at least one arm and the heating device of the robot manipulator to apply heat to the selected connector pin for establishing solder between the selected wire and selected connector pin.

2. The robotic wire termination system of claim 1, wherein the at least one arm is adapted to move the heating device to be aligned with the selected connector pin of the electrical connector.

3. The robotic wire termination system of claim 1, wherein the at least one arm is adapted to move the heating device to be concentrically aligned with the selected connector pin of the electrical connector.

4. The robotic wire termination system of claim 1, including a temperature measuring device connected to the heating device to measure a temperature of the heating device, wherein the temperature measuring device is in communication with the control unit to transmit temperature data to the control unit measured by the temperature measuring device.

5. The robotic wire termination system of claim 4, wherein the temperature measuring device is comprised of a thermocouple.

6. The robotic wire termination system of claim 1, wherein the heating device physically contacts the selected connector pin to transfer heat from the heating device to the selected connector pin.

7. The robotic wire termination system of claim 6, wherein the heating device is comprised of an electrical heating element.

8. The robotic wire termination system of claim 6, wherein the heating device includes a heat transfer portion that at least partially surrounds the selected connector pin during heating of the selected connector pin.

9. The robotic wire termination system of claim 1, wherein the heating device does not physically contact the selected connector pin during heating of the selected connector pin.

10. The robotic wire termination system of claim 9, wherein the heating device is comprised of a laser that directs a laser light towards the selected connector pin to heat the selected connector pin.

11. The robotic wire termination system of claim 1, wherein the robot manipulator is adapted to move the heating device transversely with respect to a longitudinal axis of the selected connector pin.

12. The robotic wire termination system of claim 11, wherein the robot manipulator is adapted to move the heating device inwardly and outwardly with respect to the selected connector pin.

13. The robotic wire termination system of claim 1, wherein the connector support includes a receiver opening adapted to removably receive the electrical connector.

14. The robotic wire termination system of claim 13, including a retention member attached to the connector support adapted to selectively engage the electrical connector to prevent removal of the electrical connector from the receiver opening.

15. The robotic wire termination system of claim 14, wherein the retention member selectively engages an outer edge of the electrical connector in a frictional manner.

16. The robotic wire termination system of claim 1, wherein the robot manipulator is comprised of an articulated robot.

17. The robotic wire termination system of claim 1, wherein the robot manipulator is comprised of a linear robot.

18. The robotic wire termination system of claim 1, wherein the robot manipulator is comprised of a Cartesian coordinate robot.

19. The robotic wire termination system of claim 1, wherein the robot manipulator is comprised of a parallel robot.

20. The robotic wire termination system of claim 19, wherein the robot manipulator is comprised of a delta robot.

21. A robotic wire termination system for soldering a plurality of wires to an electrical connector, comprising:

a connector support adapted to removably receive and support an electrical connector having a plurality of connector pins and a plurality of connector receptacles;

a robot manipulator having at least one arm;

a heating device attached to the at least one arm, wherein the at least one arm is adapted to move the heating device so that the heating device selectively applies heat to a selected connector pin from the plurality of connector pins;

wherein the electrical connector is positioned above the robot manipulator and the heating device;

whereby the heat applied to the selected connector pin melts solder to make an electrical connection between a selected wire from a plurality of wires and the selected connector pin; and a control unit in communication with the robot manipulator, wherein the control unit is programmed to control a position and movement of the at least one arm and the heating device of the robot manipulator to apply heat to the selected connector pin for establishing solder between the selected wire and selected connector pin.

22. The robotic wire termination system of claim 21, wherein the at least one arm is adapted to move the heating device to be aligned with the selected connector pin of the electrical connector.

23. The robotic wire termination system of claim 21, wherein the at least one arm is adapted to move the heating device to be concentrically aligned with the selected connector pin of the electrical connector.

24. The robotic wire termination system of claim 21, including a temperature measuring device connected to the heating device to measure a temperature of the heating device, wherein the temperature measuring device is in communication with the control unit to transmit temperature data to the control unit measured by the temperature measuring device.

25. The robotic wire termination system of claim 24, wherein the temperature measuring device is comprised of a thermocouple.

26. The robotic wire termination system of claim 21, wherein the heating device physically contacts the selected connector pin to transfer heat from the heating device to the selected connector pin.

27. The robotic wire termination system of claim 26, wherein the heating device is comprised of an electrical heating element.

28. The robotic wire termination system of claim 26, wherein the heating device includes a heat transfer portion that at least partially surrounds the selected connector pin during heating of the selected connector pin.

29. The robotic wire termination system of claim 21, wherein the heating device does not physically contact the selected connector pin during heating of the selected connector pin.

30. The robotic wire termination system of claim 29, wherein the heating device is comprised of a laser that directs a laser light towards the selected connector pin to heat the selected connector pin.

31. The robotic wire termination system of claim 21, wherein the robot manipulator is adapted to move the heating device transversely with respect to a longitudinal axis of the selected connector pin.

32. The robotic wire termination system of claim 31, wherein the robot manipulator is adapted to move the heating device inwardly and outwardly with respect to the selected connector pin.

33. The robotic wire termination system of claim 21, wherein the connector support includes a receiver opening adapted to removably receive the electrical connector.

34. The robotic wire termination system of claim 33, including a retention member attached to the connector support adapted to selectively engage the electrical connector to prevent removal of the electrical connector from the receiver opening.

35. The robotic wire termination system of claim 34, wherein the retention member selectively engages an outer edge of the electrical connector in a frictional manner.

36. The robotic wire termination system of claim 21, wherein the robot manipulator is comprised of an articulated robot.

37. The robotic wire termination system of claim 21, wherein the robot manipulator is comprised of a linear robot.

38. The robotic wire termination system of claim 21, wherein the robot manipulator is comprised of a Cartesian coordinate robot.

39. The robotic wire termination system of claim 21, wherein the robot manipulator is comprised of a parallel robot.

40. The robotic wire termination system of claim 39, wherein the robot manipulator is comprised of a delta robot.

41. A robotic wire termination system for soldering a plurality of wires to an electrical connector, comprising:
- a frame having a base;
- a connector support attached to the frame, wherein the connector support is adapted to removably receive and support an electrical connector having a plurality of connector pins and a plurality of connector receptacles;
- a robot manipulator having at least one arm;
- a heating device attached to the at least one arm, wherein the at least one arm is adapted to move the heating device so that the heating device selectively applies heat to a selected connector pin from the plurality of connector pins;
- wherein the connector support is positioned above the robot manipulator and the heating device so the electrical connector is correspondingly positioned above the robot manipulator and the heating device;
- whereby the heat applied to the selected connector pin melts solder to make an electrical connection between a selected wire from a plurality of wires and the selected connector pin; and
- a control unit in communication with the robot manipulator, wherein the control unit is programmed to control a position and movement of the at least one arm and the heating device of the robot manipulator to apply heat to the selected connector pin for establishing solder between the selected wire and selected connector pin.

42. The robotic wire termination system of claim 41, wherein the at least one arm is adapted to move the heating device to be aligned with the selected connector pin of the electrical connector.

43. The robotic wire termination system of claim 41, wherein the at least one arm is adapted to move the heating device to be concentrically aligned with the selected connector pin of the electrical connector.

44. The robotic wire termination system of claim 41, including a temperature measuring device connected to the heating device to measure a temperature of the heating device, wherein the temperature measuring device is in communication with the control unit to transmit temperature data to the control unit measured by the temperature measuring device.

45. The robotic wire termination system of claim 44, wherein the temperature measuring device is comprised of a thermocouple.

46. The robotic wire termination system of claim 41, wherein the heating device physically contacts the selected connector pin to transfer heat from the heating device to the selected connector pin.

47. The robotic wire termination system of claim 46, wherein the heating device is comprised of an electrical heating element.

48. The robotic wire termination system of claim 46, wherein the heating device includes a heat transfer portion that at least partially surrounds the selected connector pin during heating of the selected connector pin.

49. The robotic wire termination system of claim 41, wherein the heating device does not physically contact the selected connector pin during heating of the selected connector pin.

50. The robotic wire termination system of claim 49, wherein the heating device is comprised of a laser that directs a laser light towards the selected connector pin to heat the selected connector pin.

51. The robotic wire termination system of claim 41, wherein the robot manipulator is adapted to move the heating device transversely with respect to a longitudinal axis of the selected connector pin.

52. The robotic wire termination system of claim 51, wherein the robot manipulator is adapted to move the heating device inwardly and outwardly with respect to the selected connector pin.

53. The robotic wire termination system of claim 41, wherein the connector support includes a receiver opening adapted to removably receive the electrical connector.

54. The robotic wire termination system of claim 53, including a retention member attached to the connector support adapted to selectively engage the electrical connector to prevent removal of the electrical connector from the receiver opening.

55. The robotic wire termination system of claim 54, wherein the retention member selectively engages an outer edge of the electrical connector in a frictional manner.

56. The robotic wire termination system of claim 41, wherein the robot manipulator is comprised of an articulated robot.

57. The robotic wire termination system of claim 41, wherein the robot manipulator is comprised of a linear robot.

58. The robotic wire termination system of claim 41, wherein the robot manipulator is comprised of a Cartesian coordinate robot.

59. The robotic wire termination system of claim 41, wherein the robot manipulator is comprised of a parallel robot.

60. The robotic wire termination system of claim 59, wherein the robot manipulator is comprised of a delta robot.

61. A robotic wire termination system for soldering a plurality of wires to an electrical connector, comprising:
- a connector support adapted to removably receive and support an electrical connector having a plurality of connector pins and a plurality of connector receptacles;
- a robot manipulator having at least one arm;
- a heating device attached to the at least one arm, wherein the at least one arm is adapted to move the heating device so that the heating device selectively applies heat to a selected connector pin from the plurality of connector pins;
- wherein the heating device physically contacts the selected connector pin to transfer heat from the heating device to the selected connector pin;
- wherein the electrical connector is positioned above the robot manipulator and the heating device;
- wherein the robot manipulator is adapted to move the heating device transversely with respect to a longitudinal axis of the selected connector pin;
- wherein the robot manipulator is adapted to move the heating device inwardly and outwardly with respect to the selected connector pin;
- whereby the heat applied to the selected connector pin melts solder to make an electrical connection between a selected wire from a plurality of wires and the selected connector pin; and
- a control unit in communication with the robot manipulator, wherein the control unit is programmed to control a position and movement of the at least one arm and the heating device of the robot manipulator to apply heat to the selected connector pin for establishing solder between the selected wire and selected connector pin.

62. The robotic wire termination system of claim 61, wherein the at least one arm is adapted to move the heating device to be aligned with the selected connector pin of the electrical connector.

63. The robotic wire termination system of claim 61, wherein the at least one arm is adapted to move the heating device to be concentrically aligned with the selected connector pin of the electrical connector.

64. The robotic wire termination system of claim 61, including a temperature measuring device connected to the heating device to measure a temperature of the heating device, wherein the temperature measuring device is in communication with the control unit to transmit temperature data to the control unit measured by the temperature measuring device.

65. The robotic wire termination system of claim 61, wherein the heating device is comprised of an electrical heating element.

66. The robotic wire termination system of claim 61, wherein the heating device includes a heat transfer portion that at least partially surrounds the selected connector pin during heating of the selected connector pin.

67. The robotic wire termination system of claim 61, wherein the connector support includes a receiver opening adapted to removably receive the electrical connector.

68. The robotic wire termination system of claim 67, including a retention member attached to the connector support adapted to selectively engage the electrical connector to prevent removal of the electrical connector from the receiver opening.

69. The robotic wire termination system of claim 68, wherein the retention member selectively engages an outer edge of the electrical connector in a frictional manner.

70. The robotic wire termination system of claim 61, wherein the robot manipulator is comprised of an articulated robot.

71. The robotic wire termination system of claim 61, wherein the robot manipulator is comprised of a linear robot.

72. The robotic wire termination system of claim 61, wherein the robot manipulator is comprised of a Cartesian coordinate robot.

73. The robotic wire termination system of claim 61, wherein the robot manipulator is comprised of a parallel robot.

74. The robotic wire termination system of claim 73, wherein the robot manipulator is comprised of a delta robot.

75. The robotic wire termination system of claim 61, including a frame having a base, wherein the connector support is attached to the frame wherein the connector support is positioned above the robot manipulator and the heating device.

76. The robotic wire termination system of claim 75, wherein the electrical connector is positioned above the robot manipulator and the heating device when supported by the connector support.

77. A robotic wire termination system for soldering a plurality of wires to an electrical connector, comprising:
- a connector support adapted to removably receive and support an electrical connector having a plurality of connector pins and a plurality of connector receptacles;
- wherein the connector support includes a receiver opening adapted to removably receive the electrical connector;
- a robot manipulator having at least one arm;
- a heating device attached to the at least one arm, wherein the at least one arm is adapted to move the heating device so that the heating device selectively applies heat to a selected connector pin from the plurality of connector pins;
- wherein the heating device physically contacts the selected connector pin to transfer heat from the heating device to the selected connector pin;
- wherein the heating device is comprised of an electrical heating element;
- wherein the heating device includes a heat transfer portion that at least partially surrounds the selected connector pin during heating of the selected connector pin;
- wherein the electrical connector is positioned above the robot manipulator and the heating device;
- wherein the robot manipulator is adapted to move the heating device transversely with respect to a longitudinal axis of the selected connector pin;
- wherein the robot manipulator is adapted to move the heating device inwardly and outwardly with respect to the selected connector pin;
- whereby the heat applied to the selected connector pin melts solder to make an electrical connection between a selected wire from a plurality of wires and the selected connector pin; and
- a control unit in communication with the robot manipulator, wherein the control unit is programmed to control a position and movement of the at least one arm and the heating device of the robot manipulator to apply heat to the selected connector pin for establishing solder between the selected wire and selected connector pin.

78. The robotic wire termination system of claim 77, wherein the at least one arm is adapted to move the heating device to be aligned with the selected connector pin of the electrical connector.

79. The robotic wire termination system of claim 77, wherein the at least one arm is adapted to move the heating device to be concentrically aligned with the selected connector pin of the electrical connector.

80. The robotic wire termination system of claim 77, including a temperature measuring device connected to the heating device to measure a temperature of the heating device, wherein the temperature measuring device is in communication with the control unit to transmit temperature data to the control unit measured by the temperature measuring device.

81. The robotic wire termination system of claim 77, including a retention member attached to the connector support adapted to selectively engage the electrical connector to prevent removal of the electrical connector from the receiver opening.

82. The robotic wire termination system of claim 81, wherein the retention member selectively engages an outer edge of the electrical connector in a frictional manner.

83. The robotic wire termination system of claim 77, wherein the robot manipulator is comprised of an articulated robot.

84. The robotic wire termination system of claim 77, wherein the robot manipulator is comprised of a linear robot.

85. The robotic wire termination system of claim 77, wherein the robot manipulator is comprised of a Cartesian coordinate robot.

86. The robotic wire termination system of claim 77, wherein the robot manipulator is comprised of a parallel robot.

87. The robotic wire termination system of claim 86, wherein the robot manipulator is comprised of a delta robot.

88. The robotic wire termination system of claim 77, including a frame having a base, wherein the connector support is attached to the frame wherein the connector support is positioned above the robot manipulator and the heating device.

89. The robotic wire termination system of claim 88, wherein the electrical connector is positioned above the robot manipulator and the heating device when supported by the connector support.

* * * * *